US012766867B2

(12) United States Patent
Tezuka et al.

(10) Patent No.: US 12,766,867 B2
(45) Date of Patent: Oct. 20, 2026

(54) MULTILAYER BODY, CARD, PASSPORT, METHOD FOR PRODUCING MULTILAYER BODY, METHOD FOR PRODUCING CARD, METHOD FOR PRODUCING PASSPORT, AND LASER MARKING METHOD

(71) Applicant: Mitsubishi Chemical Corporation, Tokyo (JP)

(72) Inventors: Rie Tezuka, Nagahama (JP); Yuko Koido, Nagahama (JP); Nobuhiro Sakata, Nagahama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 230 days.

(21) Appl. No.: 18/233,982

(22) Filed: Aug. 15, 2023

(65) Prior Publication Data

US 2024/0001654 A1 Jan. 4, 2024

Related U.S. Application Data

(63) Continuation of application No. PCT/JP2022/006498, filed on Feb. 17, 2022.

(30) Foreign Application Priority Data

Feb. 18, 2021 (JP) ................................ 2021-024678

(51) Int. Cl.

| | |
|---|---|
| ***B41M 5/337*** | (2006.01) |
| ***B32B 27/08*** | (2006.01) |
| ***B32B 27/20*** | (2006.01) |
| ***B32B 27/30*** | (2006.01) |
| ***B32B 27/32*** | (2006.01) |
| ***B32B 27/36*** | (2006.01) |
| ***B41M 5/323*** | (2006.01) |
| ***B41M 5/333*** | (2006.01) |
| ***B41M 5/42*** | (2006.01) |
| ***B42D 25/455*** | (2014.01) |
| ***B42D 25/46*** | (2014.01) |
| *B42D 25/23* | (2014.01) |
| *B42D 25/24* | (2014.01) |

(52) U.S. Cl.

CPC ............ *B41M 5/323* (2013.01); *B32B 27/08* (2013.01); *B32B 27/20* (2013.01); *B32B 27/308* (2013.01); *B32B 27/32* (2013.01); *B32B 27/36* (2013.01); *B32B 27/365* (2013.01); *B41M 5/3333* (2013.01); *B41M 5/3335* (2013.01); *B41M 5/3372* (2013.01); *B41M 5/42* (2013.01); *B42D 25/455* (2014.10); *B42D 25/46* (2014.10); *B32B 2250/24* (2013.01); *B32B 2307/4026* (2013.01); *B32B 2307/718* (2013.01); *B32B 2307/7376* (2023.05); *B32B 2425/00* (2013.01); *B42D 25/23* (2014.10); *B42D 25/24* (2014.10)

(58) Field of Classification Search

CPC ....... B32B 27/08; B32B 27/20; B32B 27/308; B32B 27/32; B32B 27/36; B32B 27/365; B32B 2250/24; B32B 2307/4026; B32B 2307/718; B32B 2307/7376; B32B 2425/00; B41M 5/323; B41M 5/3333; B41M 5/3335; B41M 5/3336; B41M 5/3372; B41M 5/42; B42D 25/23; B42D 25/24

See application file for complete search history.

(56) References Cited

U.S. PATENT DOCUMENTS

| | | | | |
|---|---|---|---|---|
| 4,401,721 A * | 8/1983 | Hida | B41M 5/42 | 427/151 |
| 5,610,118 A * | 3/1997 | Smith | B41M 5/42 | 503/221 |
| 2017/0340955 A1 | 11/2017 | Cove | | |
| 2019/0375167 A1 | 12/2019 | Liu et al. | | |

FOREIGN PATENT DOCUMENTS

| | | | |
|---|---|---|---|
| CN | 101119853 | A | 2/2008 |
| CN | 102762380 | A | 10/2012 |
| CN | 104109491 | A | 10/2014 |
| CN | 110049877 | A | 7/2019 |
| EP | 1852270 | A1 | 11/2007 |
| EP | 2543510 | A1 | 1/2013 |
| JP | H02-103177 | A | 4/1990 |
| JP | H04-368881 | A | 12/1992 |

(Continued)

OTHER PUBLICATIONS

International Search Report issued in related International Patent Application No. PCT/JP2022/006498 dated Apr. 26, 2022.

Office Action issued in corresponding Chinese Patent Application No. 202280014781.2 dated Oct. 29, 2025.

Office Action issued in corresponding Chinese Patent Application No. 202280014781.2, dated Jun. 20, 2025.

Search Report issued in corresponding Chinese Patent Application No. 202280014781.2, dated Jun. 20, 2025.

Office Action issued in corresponding Chinese Patent Application No. 202280014781.2, dated Jan. 6, 2026.

(Continued)

*Primary Examiner* — Gerard Higgins

(74) *Attorney, Agent, or Firm* — Morgan, Lewis & Bockius LLP

(57) ABSTRACT

A multilayer body including a resin layer (A) and a resin layer (B), the resin layer (A) containing a resin (a) and a colorant, the content of the colorant in the resin layer (A) being in an amount less than 50 parts by mass relative to 100 parts by mass of the resin (a), the content of a developer in the resin layer (A) being less than 0.5 parts by mass relative to 100 parts by mass of the resin (a), the resin layer (B) containing a resin (b) and a developer, the content of the developer in the resin layer (B) being less than 50 parts by mass relative to 100 parts by mass of the resin (b), the content of a colorant in the resin layer (B) being 0.5 parts by mass relative to 100 parts by mass of the resin (b).

24 Claims, No Drawings

(56) References Cited

FOREIGN PATENT DOCUMENTS

| | | | |
|---|---|---|---|
| JP | 2019-104195 | A1 | 11/1997 |
| JP | H09-302236 | A | 11/1997 |
| JP | 2009-223926 | A | 10/2009 |
| WO | 2018/235451 | A1 | 12/2018 |
| WO | 2021/020269 | A1 | 2/2021 |

OTHER PUBLICATIONS

Office Action issued in corresponding Japanese Patent Application No. 2023-500933, dated Mar. 3, 2026.
Notice of Allowance issued in corresponding Chinese Patent Application No. 202280014781.2, dated Mar. 12, 2026.

* cited by examiner

MULTILAYER BODY, CARD, PASSPORT, METHOD FOR PRODUCING MULTILAYER BODY, METHOD FOR PRODUCING CARD, METHOD FOR PRODUCING PASSPORT, AND LASER MARKING METHOD

CROSS-REFERENCE TO RELATED APPLICATIONS

The present application is a continuation application of International Application No. PCT/JP2022/006498, filed on Feb. 17, 2022, which claims priority to Japanese Patent Application No. 2021-024678, filed on Feb. 18, 2021. The contents of these applications are incorporated herein by reference in their entirety.

TECHNICAL FIELD

The present invention relates to a multilayer body, a card, and a passport, and relates to a multilayer body, for example, usable for various types of marking, such as laser marking, and a card and a passport that include the multilayer body.

BACKGROUND ART

Various cards, such as a credit card, a cash card, an ID card, and a tag card, a passport, and the like, are sometimes marked with letters, a bar code, a symbol, a mark, and the like by laser irradiation. Although laser marking is practically applied in monochrome now, color laser marking by the use of a leuco colorant or the like has recently been studied. It is known that, in color laser marking, marking of various types of information is applied, for example, on a resin composition containing a thermoplastic polymer, a chromogenic component, such as a leuco colorant, and a developer (see, for example, PTL 1), a recording layer formed of a paint containing a resin, a leuco colorant, a developer, and a photothermal converting agent (see, for example, PTL 2), or the like.

In PTL 2, development of multiple colors is developed in a recording medium in which a plurality of recording layers that develop different coloring tones from layer to layer and that are each formed of a paint are alternately laminated with heat insulating layers, through the use of the absorption wavelengths, which are different from layer to layer, of the photothermal converting agents in the recording layers.

CITATION LIST

Patent Literature

PTL 1: JP H9-302236 A
PTL 2: WO 2018/235451

SUMMARY OF INVENTION

Technical Problem

However, like in PTLs 1 and 2, when a colorant, such as a leuco colorant, and a developer in such an amount that allows the colorant to sufficiently develop a color are to be contained in one resin layer, it may be difficult to form the resin layer while maintaining the achromatic state. For example, melt-film-formation is attempted for a resin layer containing the colorant and the developer which is to be used in a card or a passport. However, when the resin layer is formed by melt-film-formation, the colorant and the developer may react to develop a color by heat in kneading the resin.

Thus, the present invention has an object to provide a multilayer body that is prevented from developing a color in forming a resin layer containing a colorant and that can properly develop a color in marking by laser irradiation or the like.

Solution to Problem

As a result of intensive and extensive studies, the present inventors have found that the above problem can be solved by providing a resin layer (B) that is different from a resin layer (A) containing a colorant, incorporating a developer in the resin layer (B), and furthermore, adjusting the amounts of a colorant and a developer contained in the resin layers (A) and (B), thus completing the present invention as described below. Specifically, the present invention provides the following [1] to [36].

[1] A multilayer body including at least two layers of a resin layer (A) and a resin layer (B), the resin layer (A) containing a resin (a) and a colorant, the content of the colorant in the resin layer (A) being less than 50 parts by mass relative to 100 parts by mass of the resin (a), the content of a developer in the resin layer (A) being less than 0.5 parts by mass relative to 100 parts by mass of the resin (a), the resin layer (B) containing a resin (b) and a developer, the content of the developer in the resin layer (B) being less than 50 parts by mass relative to 100 parts by mass of the resin (b), the content of a colorant in the resin layer (B) being less than 0.5 parts by mass relative to 100 parts by mass of the resin (b).

[2] The multilayer body according to the above [1], wherein the resin layer (A) has a thickness of more than 6 μm.

[3] The multilayer body according to the above [1] or [2], wherein the resin layer (B) has a thickness of more than 6 μm.

[4] The multilayer body according to any one of the above [1] to [3], wherein the content of the colorant in the resin layer (A) is 30 parts by mass or less relative to 100 parts by mass of the resin (a).

[5] The multilayer body according to any one of the above [1] to [4], wherein the content of the developer in the resin layer (B) is 30 parts by mass or less relative to 100 parts by mass of the resin (b).

[6] The multilayer body according to any one of the above [1] to [5], wherein the colorant has a pyrolysis temperature of 200° C. or higher.

[7] The multilayer body according to any one of the above [1] to [6], wherein the developer has a pyrolysis temperature of 200° C. or higher.

[8] The multilayer body according to any one of the above [1] to [7], wherein the colorant has a crystalline melting temperature of 100° C. or higher.

[9] The multilayer body according to any one of the above [1] to [8], wherein the colorant has a crystalline melting temperature of 300° C. or lower.

[10] The multilayer body according to any one of the above [1] to [9], wherein the developer has a crystalline melting temperature of 100° C. or higher.

[11] The multilayer body according to any one of the above [1] to [10], wherein the developer has a crystalline melting temperature of 300° C. or lower.

[12] The multilayer body according to any one of the above [1] to [11], wherein both the resin (a) and the resin (b) are a thermoplastic resin.

[13] The multilayer body according to any one of the above [1] to [12], wherein the resin (a) is at least one selected from the group consisting of a polycarbonate resin, a polyester resin, a polyolefin resin, and an acrylic resin.

[14] The multilayer body according to any one of the above [1] to [13], wherein the resin (b) is at least one selected from the group consisting of a polycarbonate resin, a polyester resin, a polyolefin resin, and an acrylic resin.

[15] The multilayer body according to any one of the above [1] to [14], the multilayer body having a ratio (B1/A1) of a content (B1) to a content (A1) of 0 or more and 0.5 or less, in which the content of the colorant relative to 100 parts by mass of the resin (a) in the resin layer (A) is the content (A1) and the content of the colorant relative to 100 parts by mass of the resin (b) in the resin layer (B) is the content (B1).

[16] The multilayer body according to any one of the above [1] to [15], the multilayer body having a ratio (A2/B2) of the content (A2) to the content (B2) of 0 or more and 0.5 or less, in which the content of the developer relative to 100 parts by mass of the resin (a) in the resin layer (A) is the content (A2) and the content of the developer relative to 100 parts by mass of the resin (b) in the resin layer (B) is the content (B2).

[17] The multilayer body according to any one of the above [1] to [16], the multilayer body having a ratio (A1/B2) of the content (A1) to the content (B2) of 0.01 or more and 3 or less, in which the content of the colorant relative to 100 parts by mass of the resin (a) in the resin layer (A) is the content (A1) and the content of the developer relative to 100 parts by mass of the resin (b) in the resin layer (B) is the content (B2).

[18] The multilayer body according to any one of the above [1] to [17], wherein the resin layer (B) is directly laminated on at least one surface of the resin layer (A).

[19] The multilayer body according to any one of the above [1] to [17], further including an intermediate resin layer (C) between the resin layer (A) and the resin layer (B).

[20] The multilayer body according to any one of the above [1] to [19], wherein the multilayer body has an area of 400 $cm^2$ or less.

[21] The multilayer body according to any one of the above [1] to [20], wherein the multilayer body has an area of 200 $cm^2$ or less.

[22] The multilayer body according to any one of the above [1] to [21], wherein the multilayer body is capable of developing a color by laser irradiation.

[23] The multilayer body according to any one of the above [1] to [22], wherein the multilayer body is to be used in a card.

[24] The multilayer body according to any one of the above [1] to [22], wherein the multilayer body is to be used in a passport.

[25] A card including the multilayer body according to any one of the above [1] to [23].

[26] A passport including the multilayer body according to any one of the above [1] to and [24].

[27] A method of producing the multilayer body according to any one of the above [1] to [24], the method including a step of melt-kneading at least the resin (a) and the colorant.

[28] A method of producing the multilayer body according to any one of the above [1] to [24], the method including a step of melt-kneading at least the resin (b) and the developer.

[29] The method of producing the multilayer body according to the above or [28], the method further including a step of laminating at least the resin layer (A) and the resin layer (B).

[30] The method of producing the multilayer body according to the above [29], wherein the step of laminating at least the resin layer (A) and the resin layer (B) is performed by an extrusion method or a lamination method.

[31] A method of producing a multilayer body, the method including melt-kneading at least a resin (a) and a colorant to produce a resin composition (A), melt-kneading at least a resin (b) and a developer to produce a resin composition (B), and laminating a resin layer (A) formed from at least the resin composition (A) and a resin layer (B) formed from at least the resin composition (B) by an extrusion method or a lamination method to produce a multilayer body.

[32] A laser marking method including applying laser marking by laser irradiation on a multilayer body produced by the method of producing a multilayer body according to the above [31].

[33] A method of producing a card, the card including the multilayer body according to any one of the above [1] to [23], the method including at least a step of laminating and melt-bonding the multilayer body and another film and a step of applying laser marking by laser irradiation.

[34] A method of producing a passport, the passport including the multilayer body according to any one of the above [1] to and [24], the method including at least a step of laminating and melt-bonding the multilayer body and another film and a step of applying laser marking by laser irradiation.

[35] A method comprising applying laser marking on the multilayer body according to any one of the above [1] to [24], and using the multilayer body in a card or a passport.

[36] Use of the multilayer body according to any one of above [1] to in a card or a passport, laser marking being applied on the multilayer body.

Advantageous Effects of Invention

In the present invention, it is possible to provide a multilayer body that is prevented from developing a color in forming a resin layer containing a colorant and that can properly develop a color in marking by laser irradiation or the like.

DESCRIPTION OF EMBODIMENTS

The present invention will be described in detail below with referent to an embodiment. However, the present invention is not to be limited to the embodiment described below.

<Multilayer Body>

The multilayer body of the present invention is a multilayer body including at least two layers of a resin layer (A) and a resin layer (B), the resin layer (A) containing a resin (a) and a colorant, the resin layer (B) containing a resin (b) and a developer.

By the multilayer body of the present invention having the above configuration, when marking is to be applied, the multilayer body is subjected to laser irradiation or the like to allow the developer in the resin layer (B) to act on the colorant in the resin layer (A), whereby it is possible to allow the multilayer body to properly develop a color.

On the other hand, in the multilayer body, it is not necessary to incorporate a sufficient amount of a developer in the resin layer (A), and it is not necessary to incorporate a sufficient amount of a colorant in the resin layer (B). Thus, in forming the resin layers (A) and (B), a reaction of the colorant and the developer resulting in color development is prevented in each resin layer and thus, the achromatic state can be maintained.

The resin (a) contained in the resin layer (A) may be a thermosetting resin or a thermoplastic resin, but is preferably a thermoplastic resin.

Similarly, the resin (b) contained in the resin layer (B) may be a thermosetting resin or a thermoplastic resin, but is preferably a thermoplastic resin. Thus, both the resin (a) and the resin (b) are preferably a thermoplastic resin. By using a thermoplastic resin as the resin (a) and the resin (b), the resin layers (A) and (B) can be formed by melt-film-formation or the like, and the multilayer body can be produced by co-extrusion, press-molding, or the like, whereby the formability and productivity can be increased. In addition, by using a thermoplastic resin, in heating the multilayer body by laser irradiation or the like, the colorant and/or the developer transfers to allow the developer in the resin layer (B) to easily act on the colorant in resin layer (A), whereby the color developing property is easily increased.

Furthermore, by using a thermoplastic resin, it becomes not necessary to form the resin layers (A) and (B) by paint coating, and thus the resin layers (A) and (B) are prevented from scraping and peeling in processing or in use in an actual product. Accordingly, the storage property is increased, which is suitable for use in a passport or a card from the viewpoint of security (reliability).

[Thermoplastic Resin]

The thermoplastic resins that are preferably respectively used as the resin (a) and the resin (b) are not particularly limited, and examples thereof include a polycarbonate resin, a polyester resin, a polyolefin resin, an acrylic resin, a polystyrene resin, a polyamide resin, a polyvinyl chloride resin, a polyvinylidene chloride resin, a polyvinyl alcohol resin, an ethylene-vinyl alcohol resin, a polycycloolefin resin, an ethylene-vinyl acetate copolymer resin, an ethylene-(meth)acrylate copolymer resin, a polyphenylene ether resin, a polyacetal resin, an acrylonitrile-butadiene-styrene copolymer resin, a polyaryl ether ketone resin, a polyimide resin, a polyphenylene sulfide resin, a polyallylate resin, a polysulfone resin, a polyether sulfone resin, and a fluororesin.

Among them, as the resin (a), any of a polycarbonate resin, a polyester resin, a polyolefin resin, and an acrylic resin is preferably used. By using such a resin, a multilayer body having a high transparency is easily obtained. As the resin (a), among them, any of a polycarbonate resin and a polyester resin is more preferably used, and a polycarbonate resin is particularly preferred.

From the same point of view, as the resin (b), any of a polycarbonate resin, a polyester resin, a polyolefin resin, and an acrylic resin is preferably used, and among them, any of a polycarbonate resin and a polyester resin is more preferably used, and a polycarbonate resin is particularly preferred.

By using at least any of a polycarbonate resin and a polyester resin, in particular, a polycarbonate resin, in each of the resin (a) and the resin (b), a mechanical strength of a certain level or higher is easily secured, which enables suitable use as a card or a passport. In addition, it is then easy to prevent color development of the resin layer (A) in producing the multilayer body.

In each of the resins (a) and (b), one of the thermoplastic resins described above may be used alone or two or more thereof may be used in combination.

In each of the resin (a) and the resin (b), any of a polycarbonate resin, a polyester resin, a polyolefin resin, or an acrylic resin is preferably contained as a main component. Specifically, the resin layer (A) contains any of a polycarbonate resin, a polyester resin, a polyolefin resin, or an acrylic resin in an amount of preferably 50% by mass or more and 100% by mass or less, more preferably 70% by mass or more and 100% by mass or less, and further preferably 90% by mass or more and 100% by mass or less based on the total amount of the resins (a) contained in the resin layer (A).

Similarly, the resin layer (B) contains any of a polycarbonate resin, a polyester resin, a polyolefin resin, or an acrylic resin in an amount of preferably 50% by mass or more and 100% by mass or less, more preferably 70% by mass or more and 100% by mass or less, and further preferably 90% by mass or more and 100% by mass or less based on the total amount of the resins (b) contained in resin layer (B).

(Polycarbonate Resin)

The polycarbonate resin used in either the resin (a) or the resin (b) or both is not particularly limited, but a bisphenol-type polycarbonate can be suitably used. Bisphenol-type polycarbonate refers to a compound in which units derived from bisphenols occupy 50% by mole or more, preferably 70% by mole or more, and further preferably 90% by mole or more in the structural units derived from diols. The bisphenol-type polycarbonate may be either a homopolymer or a copolymer. The bisphenol-type polycarbonate may have a branched structure or may be of a linear structure, or may be a mixture of a resin having a branched structure and a resin having only a linear structure.

As a method for producing a bisphenol-type polycarbonate to be used in the present invention, for example, any known method, such as a phosgene method, a transesterification method, and a pyridine method, may be used. As an example, a method of producing a polycarbonate resin according to a transesterification method will be described below.

Transesterification method is a production method in which a bisphenol and a carbonic acid diester are subjected to a melt-transesterification polycondensation with a basic catalyst added and with an acidic substance that neutralizes the basic catalyst further added.

As a typical example of the bisphenol, 2,2-bis(4-hydroxyphenyl)propane, i.e., bisphenol A, is preferably used. The bisphenol A may be partially or entirely replaced with another bisphenol.

Specific examples of the bisphenol include 2,2-bis(4-hydroxyphenyl)propane (bisphenol A), 1,1-bis(4-hydroxyphenyl)-1-phenylethane (bisphenol AP), 2,2-bis(4-hydroxyphenyl)hexafluoropropane (bisphenol AF), 2,2-bis(4-hydroxyphenyl)butane (bisphenol B), bis(4-hydroxyphenyl) diphenylmethane (bisphenol BP), 2,2-bis(3-methyl-4-hydroxyphenyl)propane (bisphenol C), 1,1-bis(4-hydroxyphenyl)ethane (bisphenol E), bis(4-hydroxyphenyl) methane (bisphenol F), 2,2-bis(4-hydroxy-3-isopropylphenyl)propane (bisphenol G), 1,3-bis(2-(4-hydroxyphenyl)-2-propyl)benzene (bisphenol M), bis(4-hydroxyphenyl)sulfone (bisphenol S), 1,4-bis(2-(4-hydroxyphenyl)-2-propyl)benzene (bisphenol P), 5,5'-(1-methylethylidene)-bis[1,1'-(bisphenyl)-2-ol]propane (bisphenol PH), 1,1-bis(4-hydroxyphenyl)3,3,5-trimethylcyclohexane (bisphenol TMC), and 1,1-bis(4-hydroxyphenyl)cyclohexane (bisphenol Z).

On the other hand, typical examples of the carbonic acid diester include diphenyl carbonate, ditolyl carbonate, bis (chlorophenyl) carbonate, m-cresyl carbonate, dinaphthyl carbonate, bis(biphenyl) carbonate, diethyl carbonate, dimethyl carbonate, dibutyl carbonate, and dicyclohexyl carbonate. Among them, diphenyl carbonate is particularly preferably used.

The mass average molecular weight of the bisphenol-type polycarbonate to be used in the present invention is, in terms of the balance between mechanical characteristics and form-processability, typically in the range of 10,000 or more and 100,000 or less, and preferably 30,000 or more and 80,000 or less. The mass average molecular weight can be measured by gel permeation chromatography (GPC) with polystyrenes used as standard substances.

The viscosity average molecular weight of the bisphenol-type polycarbonate is, in terms of the balance between mechanical characteristics and form-processability, typically in the range of 12,000 or more and 40,000 or less, preferably 15,000 or more and 35,000 or less, more preferably 20,000 or more and 30,000 or less, and further preferably 22,000 or more and 28,000 or less. The viscosity average molecular weight can be measured as follows. An Ubbelohde viscometer is used with dichloromethane as a solvent to determine a limiting viscosity ([η]) (unit: dl/g) at a temperature of 20° C., and the viscosity average molecular weight is calculated according to the Schnell's viscosity formula: $\eta=1.23\times10^{-4}\,M^{0.83}$.

The polycarbonate resin used in either the resin (a) or the resin (b) or both is also preferably a polycarbonate resin containing a structural unit derived from a dihydroxy compound having in a part of the structure a moiety represented by the following formula (1). By using such a polycarbonate resin, a multilayer body for laser marking that can be marked with clear letters, images, and the like by laser irradiation, that is superior in surface hardness and heat resistance, and further superior in weather resistance, and that can be obtained by using a plant-derived resin material can be provided.

$$-\!(CH_2-O)\!- \quad (1)$$

However, a case where the moiety represented by the formula (1) is a part of $-CH_2-O-H$ is excluded. In other words, the dihydroxy compound refers to a compound at least having two hydroxy groups and a moiety of the formula (1).

The dihydroxy compound having in a part of the structure a moiety represented by the formula (1) is not particularly limited as long as it has a structure represented by the formula (1) in the molecular. Specific examples thereof include a dihydroxy compound represented by the following formula (2) and a dihydroxy compound having a cyclic ether structure as typified by a spiroglycol represented by the following formula (3) and the like.

(2)

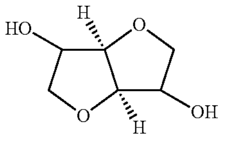

(3)

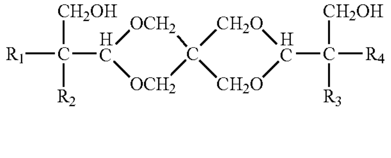

In the formula (3), $R_1$ to $R_4$ each independently represent an alkyl group having 1 to 3 carbon atoms.

A compound having an aromatic group in a side chain and having an ether group bonded to an aromatic group in the main chain, such as 9,9-bis(4-(2-hydroxyethoxy)phenyl) fluorene or 9,9-bis(4-(2-hydroxyethoxy)-substituted phenyl) fluorene (examples of the substituent in the substituted phenyl include a linear or branched alkyl group having about 1 to 6 carbon atoms, a cycloalkyl group, and an aryl group, such as a phenyl group) is also exemplified.

Among the compounds, a dihydroxy compound having a cyclic ether structure is preferred and an anhydrous sugar alcohol as represented by the formula (2) is particularly preferred. More specific examples of the dihydroxy compound represented by the formula (2) include isosorbide, isomannide, and isoidide which are a stereoisomer to one another.

One of the compounds may be used alone or two or more thereof may be used in combination.

In a case where the polycarbonate resin contains a structural unit derived from a dihydroxy compound having in a part of the structure a moiety represented by the formula (1), the polycarbonate resin may contain a structural unit other than the structural unit, and preferably contains, for example, a structural unit derived from at least one dihydroxy compound selected from an aliphatic dihydroxy compound and an alicyclic dihydroxy compound.

An example of the aliphatic dihydroxy compound is an aliphatic dihydroxy compound having about 2 to 12 carbon atoms, and a preferred example thereof is at least one selected from ethylene glycol, 1,3-propanediol, 1,4-butanediol, 1,5-pentanediol, and 1,6-hexanediol. As the structural unit derived from an aliphatic dihydroxy compound, for example, those described in WO2004/111106 can be used.

The structural unit derived from an alicyclic dihydroxy compound preferably contains at least any of a 5-membered ring structure and a 6-membered ring structure, and in particular, the 6-membered ring structure may be fixed in a chain form or a boat form by covalent bonds. By containing a structural unit derived from an alicyclic dihydroxy compound having such a structure, the heat resistance of the resulting polycarbonate resin can be increased.

The number of carbon atoms contained in the alicyclic dihydroxy compound is, for example, 5 to 70, preferably 6 to 50, and further preferably 8 to 30.

A preferred example of the alicyclic dihydroxy compound is at least one selected from cyclohexanedimethanol, tricyclodecanedimethanol, adamantanediol, and pentacyclopentadecanedimethanol, and from the viewpoint of economy and heat resistance, cyclohexanedimethanol or tricyclodecanedimethanol is further preferred, and cyclohexanedimethanol is furthermore preferred. In terms of industrial availability, the cyclohexanedimethanol is preferably 1,4-cyclohexanedimethanol.

As the structural unit derived from an alicyclic dihydroxy compound, those described in WO2007/148604 can also be used.

In a case where the polycarbonate resin contains a structural unit derived from a dihydroxy compound having in a part of the structure a moiety represented by the formula (1), a structural unit derived from a dihydroxy compound other than the structural units derived from the aliphatic dihydroxy compounds or the alicyclic dihydroxy compounds described above may be contained. For example, a small amount of 2,2-bis(4-hydroxyphenyl)propane (bisphenol-A) or the like may be co-polymerized therein.

In a case where the polycarbonate resin contains a structural unit derived from a dihydroxy compound having in a part of the structure a moiety represented by the formula (1), the proportion of the structural unit contained is preferably 20% by mole or more, more preferably 30% by mole or more, further preferably 40% by mole or more, and furthermore preferably 50% by mole or more, and is preferably 90% by mole or less, more preferably 80% by mole or less, and further preferably 70% by mole or less.

In a case where the polycarbonate resin contains a structural unit derived from a dihydroxy compound having in a part of the structure a moiety represented by the formula (1), the polycarbonate resin can be produced by either a phosgene method, or a transesterification method in which a carbonic acid diester is reacted. Among them, a transesterification method in which a dihydroxy compound having in a part of the structure a moiety represented by the formula (1) and another dihydroxy compound are reacted with a carbonic acid diester in the presence of a polymerization catalyst is preferred.

As the carbonic acid diester, the compounds listed above can be used, and among them, diphenyl carbonate is suitably used.

In a case where the polycarbonate resin contains a structural unit derived from a dihydroxy compound having in a part of the structure a moiety represented by the formula (1), the molecular weight thereof can be expressed by a reduced viscosity, and the reduced viscosity is, from the viewpoint of imparting mechanical strength, for example, 0.3 dL/g or more, and preferably 0.35 dL/g or more, and, from the viewpoint of increasing the fluidity in forming to increase the productivity and formability, is, for example, 1.2 dL/g or less, preferably 1 dL/g or less, and further preferably 0.8 dL/g or less.

The reduced viscosity is measured by using dichloromethane as a solvent to precisely prepare the polycarbonate resin concentration to 0.6 g/dL and using an Ubbelohde viscosity tube at a temperature of 20.0° C.±0.1° C.

In either the resin (a) or the resin (b) or both, one selected from the polycarbonate resins described above may be used alone or two or more thereof may be used in combination. In a case where a polycarbonate resin is used as the resin (a) and the resin (b), the polycarbonate resins respectively used as the resin (a) and the resin (b) may be the same as or different from each other.

The glass transition temperature of the polycarbonate resin is, for example, 70° C. or higher, preferably 80° C. or higher, more preferably 90° C. or higher, and further preferably 100° C. or higher, and is, for example, 200° C. or lower, preferably 180° C. or lower, more preferably 170° C. or lower, and further preferably 165° C. or lower. The polycarbonate resin may generally have a single glass transition temperature. When the glass transition temperature is the above upper limit or lower, the resin layer (A) and the resin layer (B) are easily laminated at a relatively low temperature without allowing the colorant to develop a color. When the glass transition temperature is the above lower limit or higher, the heat resistance can be secured, which enables suitable use as a passport or a card.

When the polycarbonate resin is used as the resin layer (A), the glass transition temperature thereof is preferably lower than the crystalline melting temperature of the colorant contained in the resin layer (A), and more preferably 5° C. or more lower than the crystalline melting temperature of the colorant. When the glass transition temperature is lower than the crystalline melting temperature of the colorant, the resin layer (A) can be laminated on the resin layer (B) or the like with the colorant in an unmelted state, and thus, color development in lamination is easily prevented.

When the polycarbonate resin is used in the resin layer (B), the glass transition temperature thereof is preferably lower than the crystalline melting temperature of the developer contained in the resin layer (B), and more preferably 5° C. or more lower than the crystalline melting temperature of the developer. When the glass transition temperature is lower than the crystalline melting temperature of the developer, the resin layer (B) can be laminated on the resin layer (A) or the like with the developer in an unmelted state, and thus, color development in lamination is easily prevented.

The glass transition temperature can be adjusted by appropriately selecting the ratio of the structural units that constitute the polycarbonate resin. The glass transition temperature of the polycarbonate resin can be determined by temperature variance measurement of dynamic viscoelasticity using a viscoelastic spectrometer. For example, temperature variance measurement of dynamic viscoelasticity is performed using a viscoelastic spectrometer "DVA-200" (manufactured by IT Keisoku Seigyo K.K.) at a strain of 0.07%, a frequency of 1 Hz, and a temperature rise rate of 3° C./min with reference to JIS K7244-4:1999, and the temperature corresponding to a peak of a principal dispersion of the loss tangent (tan δ) is advantageously taken as a glass transition temperature.

As the polycarbonate resin, a commercial product can be used, and specifically, as a bisphenol-type polycarbonate, "lupilon" series and "NOVAREX" series manufactured by Mitsubishi Engineering-Plastics Corporation, "CALIBRE" series manufactured by Sumika Polycarbonate Ltd., and the like can be used. As a polycarbonate resin containing a structural unit derived from a dihydroxy compound having a moiety represented by the formula (1), "DURABIO" series manufactured by Mitsubishi Chemical Corporation and the like can be used.

(Polyester Resin)

The polyester resin may be a homopolyester or a copolyester. The homopolyester is preferably an aromatic polyester obtained by subjecting an aromatic dicarboxylic acid and an aliphatic glycol to polycondensation. Examples of the aromatic dicarboxylic acid include terephthalic acid and 2,6-naphthalene dicarboxylic acid, and examples of the aliphatic glycol include ethylene glycol, diethylene glycol, butanediol, and 1,4-cyclohexanedimethanol. A typical example of the aromatic dicarboxylic acid is terephthalic acid, typical examples of the aliphatic glycol include ethylene glycol and butanediol, and typical examples of the homopolyester include polyethylene terephthalate (PET) and polybutylene terephthalate (PBT).

On the other hand, examples of the dicarboxylic acid component of the copolymer polyester include one or two or more of isophthalic acid, phthalic acid, terephthalic acid, 2,6-naphthalene dicarboxylic acid, adipic acid, sebacic acid, and oxycarboxylic acid, and examples of the glycol component include one or two or more of ethylene glycol, diethylene glycol, propylene glycol, butanediol, 1,4-cyclohexanedimethanol (1,4-CHDM), and neopentyl glycol.

The polyester may be a crystalline polyester or an amorphous polyester, but is preferably an amorphous polyester. By using an amorphous polyester, a good adhesiveness to another resin layer (resin layer (A) or (B)) or an intermediate resin layer (C) described later is easily achieved, and a good transparency is easily achieved, which are preferable. Furthermore, in the case of use as a card or a passport, a good adhesiveness to another member, such as a core sheet or a protective layer described later, that constitutes the card or the passport is also achieved.

The amorphous polyester may be any one that is a substantially non-crystalline polyester. As the substantially non-crystalline polyester (including low-crystalline polyester), a polyester that shows no clear crystal melting peak in temperature rising with a differential scanning calorimeter (DSC), and a polyester that has a crystallinity but has a low crystallization rate, and does not turn to a highly crystalline state in forming by an extrusion film-forming method or the like, or a polyester that has a crystallinity but has a crystal melting heat (AHm) as low as 10 J/g or less as observed in temperature rising with a differential scanning calorimeter (DSC) can be used. In other words, the amorphous polyester of the present invention includes a "crystalline polyester in a non-crystalline state".

As the amorphous polyester, a copolymer polyester containing terephthalic acid as a main component of the dicarboxylic acid component and containing 20% by mole or more and 80% by mole or less of 1,4-CHDM and 20% by mole or more and 80% by mole or less of ethylene glycol as main components of the glycol component is preferred in terms of easily achieving both a practically sufficient heat resistance and a low temperature processability and of availability of the raw materials. Such a copolymer polyester is known as a PETG resin (glycol-modified polyethylene terephthalate).

Here, the "main component" in the dicarboxylic acid component means that the dicarboxylic acid component contains terephthalic acid in an amount of 70% by mole or more, preferably 80% by mole or more, and more preferably 98% by mole or more, based on the entire amount of the dicarboxylic acid component (100% by mole). The "main components" in the diol component means that the diol component contains 1,4-CHDM and ethylene glycol in total of preferably 70% by mole or more, more preferably 80% by mole or more, and further preferably 90% by mole or more, based on the entire amount of the diol component (100% by mole).

When the amount of 1,4-CHDM in the diol component is the lower limit or more, the characteristics as a crystalline resin are suppressed, and lowering in the transparency occurring with crystallization is easily suppressed, and a good adhesiveness to another layer is easily achieved. When the amount of 1,4-CHDM is the upper limit or less, similarly, the characteristics as a crystalline resin are suppressed, and lowering in the transparency occurring with crystallization is easily suppressed, and a good adhesiveness to another layer is easily achieved, which are preferable.

Among the copolymer polyesters within the above formulation range, it is known that, in a formulation containing about 30% by mole of 1,4-CHDM based on the diol component, crystallization behavior is not observed also in a differential scanning calorimeter (DSC) measurement and a completely amorphous property is shown. As the completely amorphous polyester, an example of the PETG resin is "Easter GN001" manufactured by Eastman Chemical Company.

However, the amorphous polyester is not limited thereto, and one having a low crystallinity, for example, a low crystalline polyester, such as a PET resin with diethylene glycol copolymerized therein, a PET resin or a PBT resin with isophthalic acid copolymerized therein, or a copolymer polyester resin having a structure in which various copolymer components are incorporated to inhibit crystallization can be used as a substantially non-crystalline polyester. A polyester resin obtained by replacing a part or the whole of terephthalic acid with naphthalene dicarboxylic acid in the polyester resin exemplified above can also be similarly used as long as it is amorphous.

In either the resin (a) or the resin (b) or both, one of the polyester resins described above may be used alone or two or more thereof may be used in combination. When a polyester resin is used in the resin (a) and the resin (b), the polyester resins respectively used in the resin (a) and the resin (b) may be the same as or different from each other.

(Polyolefin Resin)

Examples of the polyolefin resin include polymers of various chain olefin, such as ethylene, propylene, isobutylene, butene, poly(4-methylpentene), and isoprene or copolymers thereof. Among them, a polyethylene resin and a polypropylene resin are preferred, and among them, a polyethylene resin is more preferred.

The polyethylene resin is not particularly limited, and may be any of a high density polyethylene (HDPE; density: 0.942 g/cm$^3$ or more), a medium density polyethylene (MDPE; density: 0.930 g/cm$^3$ or more and less than 0.942 g/cm$^3$), a low density polyethylene (LDPE; density: less than 0.930 g/cm$^3$), or may be a linear low density polyethylene (LLDPE). A linear low density polyethylene is preferred. Accordingly, a polyethylene resin is preferably used both in the resin (a) and the resin (b), and among them, a linear low density polyethylene is preferably used both in the resin (a) and the resin (b).

The polypropylene resin may be a homopolypropylene, or may be a random copolymer (random polypropylene), a block copolymer (block polypropylene), or the like of propylene with an α-olefin, such as ethylene, 1-butene, 1-pentene, 1-hexene, 1-heptene, 1-octene, 1-nonene, or 1-decene.

In either the resin (a) or the resin (b) or both, one selected from the polyolefin resins described above may be used alone or two or more thereof may be used in combination. When a polyolefin resin is used in the resin (a) and the resin (b), the polyolefin resins respectively used in the resin (a) and the resin (b) may be the same as or different from each other.

(Acrylic Resin)

As the acrylic resin, an acrylic polymer obtained by polymerizing or copolymerizing various (meth)acrylates can be used. As the acrylic copolymer, one obtained by polymerizing monomers containing an alkyl (meth)acrylate as a main component (for example, 50% by mole or more, preferably 70 to 100% by mole of all the monomers) is preferably used. As the alkyl (meth)acrylate, for example, one in which the alkyl group has about 1 to 18 carbon atoms is advantageously used.

In either the resin (a) or the resin (b) or both, as the acrylic resin, one selected from the acrylic resins described above may be used alone or two or more thereof may be used in combination. When an acrylic resin is used in the resin (a) and the resin (b), the acrylic resins respectively used in the resin (a) and the resin (b) may be the same as or different from each other.

The thermoplastic resins used in the resin (a) and the resin (b) may be the same type or different types, but the same type is preferably used. Accordingly, for example, when the resin (a) contains a polycarbonate resin as a main component, the resin (b) preferably also contains a polycarbonate resin as a main component, and when the resin (a) contains a polyester resin as a main component, the resin (b) preferably also contains a polyester resin as a main component. Similarly, when the resin (a) contains an acrylic resin as a main component, the resin (b) advantageously also contains an acrylic resin as a main component, and when the resin (a) contains a polyolefin resin as a main component, the resin (b) advantageously also contains a polyolefin resin as a main component.

By the resin (a) and the resin (b) containing the same types of thermoplastic resin as a main component, a multilayer body is easily produced. Moreover, when the resin layer (A) and the resin layer (B) are directly laminated, the adhesiveness therebetween is increased. Also, when the resin layer (A) and the resin layer (B) are laminated via the intermediate resin layer (C), by appropriately selecting a resin for the intermediate resin layer (C), the resin layer (A) and the resin layer (B) are easily laminated with a high bonding force via the intermediate resin layer (C).

An aspect in which either of the resin (a) or the resin (b) contains a polyester resin as a main component and the other of the resin (a) or the resin (b) contains a polycarbonate resin as a main component is also preferred. In this case, as the polyester resin, as described above, from the viewpoints of the adhesiveness between the resin layer (A) and the resin layer (B) and suppression of reduction in transparency occurring with crystallization, an amorphous polyester, in particular, a PETG resin is preferably used.

An aspect in which a polyester resin and a polycarbonate resin are used in combination as either the resin (a) or the resin (b) or as each of both is also preferred.

<Colorant and Developer>

The resin layer (A) of the present invention contains the resin (a) and a colorant. The colorant is a colorant that is allowed to develop a color by a developer which is described later. The content of the colorant in the resin layer (A) is preferably less than 50 parts by mass relative to 100 parts by mass of the resin (a) contained in the resin layer (A). The content of the colorant relative to 100 parts by mass of the resin (a) in the resin layer (A) is often referred to as "content (A1)".

When the content (A1) is less than 50 parts by mass, the multilayer body can undergo color development commensurate with the content. Moreover, improper color development of the resin layer (A), for example, in forming the resin layer (A) or in forming the multilayer body and reduction in the mechanical strength of the resin layer (A) can be prevented. These enable suitable use for a passport or a card. From these points of view, the content (A1) is more preferably 30 parts by mass or less, further preferably 15 parts by mass or less, furthermore preferably 10 parts by mass or less, furthermore preferably 8 parts by mass or less, particularly preferably 6 parts by mass or less, especially preferably 4 parts by mass or less, and most preferably 2 parts by mass or less.

The content (A1) is preferably 0.01 part by mass or more. When the content (A1) is 0.01 part by mass or more, it is possible to allow the colorant to properly develop a color through heating by laser irradiation or the like. From the viewpoint of increasing the color developing property, the content (A1) of the colorant is more preferably 0.02 parts by mass or more, further preferably 0.1 part by mass or more, furthermore preferably 0.3 parts by mass or more, particularly preferably 0.5 parts by mass or more, especially preferably 0.7 parts by mass or more, and most preferably 0.9 parts by mass or more.

The resin layer (A) preferably does not contain a developer, but may contain a developer. In an embodiment of the present invention, the content of a developer in the resin layer (A) is less than 0.5 parts by mass relative to 100 parts by mass of the resin (a). When the content of a developer is 0.5 parts by mass or more, the developer may react with the colorant blended in the resin (a), for example, by heat in kneading in forming the resin layer (A), to develop a color. Hereinafter, the content of a developer relative to 100 parts by mass of the resin (a) in the resin layer (A) is often referred to as "content (A2)".

From the viewpoint of properly suppressing color development in forming the resin layer (A), the content (A2) is preferably 0.35 parts by mass or less, more preferably 0.2 parts by mass or less, further preferably 0.1 part by mass or less, furthermore preferably 0.05 parts by mass or less, and particularly preferably 0.03 parts by mass or less. From the viewpoint of properly suppressing color development in forming the resin layer (A), a lower value is more preferred as the content (A2), and thus, the content (A2) is 0 parts by mass or more, and may be 0.01 part by mass or more.

In an embodiment of the present invention, "not contain a developer" means substantially not containing a developer and encompasses an aspect in which a developer is intendedly not incorporated but is contained as an inevitable impurity.

The resin layer (B) of the present invention contains the resin (b) and a developer. In the present invention, by the resin layer (B) containing a developer, when the multilayer body is heated by laser irradiation or the like to heat the colorant, developer, and the like, the colorant in the resin layer (A) is allowed to develop a color by the developer in the resin layer (B).

When the resin layer (B) is directly laminated on the resin layer (A), the colorant in the resin layer (A) develops a color at the interface between the resin layer (A) and the resin layer (B), or develops a color in the vicinity of the interface by the colorant and/or the developer heated by laser irradiation appropriately transferring in the multilayer body.

When the intermediate resin layer (C) described later is provided, the colorant in the resin layer (A) and/or the developer in the resin layer (B) is heated with laser irradiation or the like to appropriately transfer in the multilayer body, and the colorant in the resin layer (A) develops a color in the interior of the intermediate resin layer (C), at the interface between the intermediate resin layer (C) and the resin layer (A) or the resin layer (B), or in the vicinity of the interface.

The content of the developer in the resin layer (B) is preferably less than 50 parts by mass relative to 100 parts by mass of the resin (b). Hereinafter, the content of the developer relative to 100 parts by mass of the resin (b) in the resin layer (B) is often referred to as "content (B2)".

When the content (B2) of the developer is less than 50 parts by mass, the multilayer body can undergo color development commensurate with the content. Moreover, improper color development of the resin layer (B), for example, in forming the resin layer (B) or in forming the multilayer body can also be prevented. Reduction in the mechanical strength of the resin layer (B) can also be prevented. These enable suitable use for a passport or a card. From these points of view, the content (B2) of the developer in the resin layer (B) is more preferably 30 parts by mass or less, further preferably 20 parts by mass or less, furthermore preferably 15 parts by mass or less, furthermore preferably 10 parts by mass or less, particularly preferably 8 parts by mass or less, and especially preferably 5 parts by mass or less.

The content (B2) of the developer in the resin layer (B) is preferably 0.05 parts by mass or more. When the content (B2) is 0.05 parts by mass or more, in marking by laser irradiation or the like, it is possible to allow the colorant in the resin layer (A) to properly develop a color by the developer blended in the resin layer (B). The content (B2) of the developer is, from the viewpoint of increasing the color developing property of the multilayer body, more preferably 0.2 parts by mass or more, further preferably 0.5 parts by mass or more, furthermore preferably 1 part by mass or more, particularly preferably 1.5 parts by mass or more, and especially preferably 2.2 parts by mass or more.

The resin layer (B) preferably does not contain a colorant, but may contain a colorant. In an embodiment of the present invention, the content of a colorant in the resin layer (B) is less than 0.5 parts by mass relative to 100 parts by mass of the resin (b). Hereinafter, the content of a colorant relative to 100 parts by mass of the resin (b) in the resin layer (B) is often referred to as "content (B1)". When the content (B1) is 0.5 parts by mass or more, the colorant may react with the developer to develop a color, for example, by heat in kneading a resin in forming the resin layer (B).

From the viewpoint of properly suppressing color development in forming the resin layer (B), the content (B1) of a colorant is preferably 0.1 part by mass or less, more preferably 0.03 parts by mass or less, further preferably 0.01 part by mass or less, and furthermore preferably 0.005 parts by mass or less. As the content (B1) of a colorant in the resin layer (B), from the viewpoint of properly suppressing color development in forming the resin layer (B), a lower value is more preferred, and the content is 0 parts by mass or more, and may be 0.001 part by mass or more.

In an embodiment of the present invention, "not contain a colorant" means substantially not containing a colorant, and encompasses an aspect in which a colorant is intendedly not incorporated but is contained as an inevitable impurity.

The content (B1) of a colorant in the resin layer (B) is preferably lower than the content (A1) of the colorant in the resin layer (A). When the content (B1) is lower than the content (A1), it is possible to allow the multilayer body to properly develop a color by the colorant blended in the resin layer (A) in marking by laser irradiation or the like while securely suppressing color development in forming the resin layer (B). From the above point of view, the ratio (B1/A1) of the content (B1) to the content (A1) is preferably 0 or more and 0.5 or less, further preferably 0 or more and 0.1 or less, further preferably 0 or more and 0.05 or less, and furthermore preferably 0 or more and 0.01 or less.

The content (B2) of the developer in the resin layer (B) is preferably higher than the content (A2) of a developer in the resin layer (A). When the content (B2) is higher than the content (A2), it is possible to allow the colorant in the resin layer (A) to properly develop a color by the developer blended in the resin layer (B) in marking by laser irradiation or the like while securely suppressing color development in forming the resin layer (A). From the above point of view, the ratio (A2/B2) of the content (A2) to the content (B2) is preferably 0 or more and 0.5 or less, further preferably 0 or more and 0.1 or less, further preferably 0 or more and 0.05 or less, and furthermore preferably 0 or more and 0.02 or less.

The ratio (A1/B2) of the content (A1) of the colorant in the resin layer (A) to the content (B2) of the developer in the resin layer (B) is preferably 0.01 or more and 3 or less, further preferably 0.05 or more and 2 or less, further preferably 0.1 or more and 1.5 or less, furthermore preferably 0.2 or more and 1.3 or less, furthermore preferably 0.3 or more and 1.1 or less, furthermore preferably 0.35 or more and 1 or less, and furthermore preferably 0.4 or more and 0.8 or less. With such a content ratio, the multilayer body is easily allowed to properly develop a color in marking by laser irradiation or the like. [Colorant]

The colorant and the developer used in the present invention will be described in detail below. An example of the colorant for use in the present invention is a leuco colorant. Leuco colorant is generally basic, and those known in the field of pressure sensitive or thermosensitive recording paper can be used. Any leuco colorant can be used as long as it is colorless or has a light color before color development. The leuco colorant is preferably a leuco dye.

The pyrolysis temperature of the colorant is preferably 200° C. or higher. When the pyrolysis temperature of the colorant is 200° C. or higher, the colorant does not pyrolytically decompose, for example, in forming the resin layer (A) and thus, it is possible to allow the colorant to properly develop a color in the multilayer body. The pyrolysis temperature of the colorant is, from the above point of view, more preferably 220° C. or higher, further preferably 240° C. or higher, furthermore preferably 260° C. or higher, particularly preferably 280° C. or higher, and especially preferably 300° C. or higher. The pyrolysis temperature of the colorant is generally, but not particularly limited to, 360° C. or lower, and may be 355° C. or lower.

As the pyrolysis temperatures of the colorant and the developer which is described later, a temperature at which the weight is reduced 5% in thermogravimetric analysis (TGA) in which the temperature is increased at a temperature rising rate of 10° C./min in the atmosphere is advantageously taken as the pyrolysis temperature.

The crystalline melting temperature of the colorant is preferably 100° C. or higher. When the crystalline melting temperature of the colorant is 100° C. or higher, even under a high temperature environment in forming a resin layer or in use of the multilayer body as a card, passport, or the like, bleeding of the colorant onto a surface can be prevented. The crystalline melting temperature of the colorant is, from the above point of view, more preferably 120° C. or higher, further preferably 140° C. or higher, furthermore preferably 150° C. or higher, and particularly preferably 160° C. or higher.

The crystalline melting temperature of the colorant is preferably 300° C. or lower. When the crystalline melting temperature is 300° C. or lower, a good dispersibility of the colorant is achieved in forming the resin layer (A) and thus, uneven color development and deterioration in mechanical properties are less likely to occur. From the above point of view, the crystalline melting temperature of the colorant is more preferably 260° C. or lower, further preferably 240° C. or lower, furthermore preferably 220° C. or lower, and particularly preferably 200° C. or lower.

The crystalline melting temperatures of the colorant and the developer which is described later can be determined by measuring a peak top temperature of a melting peak in a DSC curve detected when the temperature is increased at a temperature rising rate of 10° C./min under a nitrogen atmosphere with a differential scanning calorimeter (DSC).

In the resin layer (A), the colorant may not be enclosed in a capsule or the like, although with no limitation, and, for example, a compound described later itself that constitutes a colorant may be dispersed or dissolved in the resin (a) which constitutes the resin layer (A).

An example of the leuco colorant used as a colorant is a compound having a tendency to develop a color by heating in the state where it is bound with a developer. A particular example of the leuco colorant is a colorless or light color compound that has a partial backbone of lactone, lactam, sultone, spiropyran, ester, amide, or the like, the partial backbone immediately opening or cleaving when the compound is brought into contact with a developer and is heated.

Specific examples of the leuco colorant include a triphenylmethane-based leuco dye, a fluoran-based leuco dye, a fluorene-based leuco dye, and a divinyl-based leuco dye. Specific examples of typical colorless or light color dyes (dye precursors) include, but not limited to, the following compounds.

Examples of the triphenylmethane-based leuco dye include 3,3-bis(4-dimethylaminophenyl)-6-dimethylaminophthalide (referred to as "Crystal Violet Lactone"), 3,3-bis(4-dimethylaminophenyl)phthalide (referred to as "Malachite Green Lactone"), and 3-(4-dimethylaminophenyl)-3-(4-diethylamino-2-methylphenyl)-6-dimethylaminophthalide.

Examples of the fluoran-based leuco dye include 2-methyl-6-(N-p-tolyl-N-ethyl amino)fluoran, 3-N-ethyl-N-isopentylamino-7,8-benzofluoran, 3-diethylamino-6-methylfluoran, 3-diethylamino-6-methyl-7-anilinofluoran, 3-diethylamino-6-methyl-7-(o,p-dimethylanilino)fluoran, 3-diethylamino-6-methyl-7-chlorofluoran, 3-diethylamino-6-methyl-7-(m-trifluoromethylanilino)fluoran, 3-diethylamino-6-methyl-7-(o-chloroanilino)fluoran, 3-diethylamino-6-methyl-7-(p-chloroanilino)fluoran, 3-diethylamino-6-methyl-7-(o-fluoroanilino)fluoran, 3-diethylamino-6-methyl-7-(m-methylanilino)fluoran, 3-diethylamino-6-methyl-7-octylanilinofluoran, 3-diethylamino-6-methyl-7-octylaminofluoran, 3-diethylamino-6-methyl-7-benzylaminofluoran, 3-diethylamino-6-methyl-7-dibenzylaminofluoran, 3-diethylamino-6-chloro-7-methylfluoran, 3-diethylamino-6-chloro-7-anilinofluoran, 3-diethylamino-6-chloro-7-p-methylanilinofluoran, 3-diethylamino-6-ethoxyethyl-7-anilinofluoran, 3-diethylamino-7-methylfluoran, 3-diethylamino-7-chlorofluoran, 3-diethylamino-7-(m-trifluoromethyl anilino)fluoran, 3-diethylamino-7-(o-chloroanilino)fluoran, 3-diethylamino-7-(p-chloroanilino)fluoran, 3-diethylamino-7-(o-fluoroanilino)fluoran, 3-diethylamino-benzo[a]fluoran, 3-diethylamino-benzo[c]fluoran, 3-dibutylamino-6-methyl-fluoran, 3-dibutylamino-6-methyl-7-anilinofluoran, 3-dibutylamino-6-methyl-7-(o,p-dimethylanilino)fluoran, 3-dibutylamino-6-methyl-7-(o-chloroanilino)fluoran, 3-dibutylamino-6-methyl-7-(p-chloroanilino)fluoran, 3-dibutylamino-6-methyl-7-(o-fluoroanilino)fluoran, 3-dibutylamino-6-methyl-7-(m-trifluoromethylanilino)fluoran, 3-dibutylamino-6-methyl-chlorofluoran, 3-dibutylamino-6-ethoxyethyl-7-anilinofluoran, 3-dibutylamino-6-chloro-7-anilinofluoran, 3-dibutylamino-6-methyl-7-p-methylanilinofluoran, 3-dibutylamino-7-(o-chloroanilino)fluoran, 3-dibutylamino-7-(o-fluoroanilino)fluoran, 3-di-pentylamino-6-methyl-7-anilinofluoran, 3-di-pentylamino-6-methyl-7-(p-chloroanilino)fluoran, 3-di-pentylamino-7-(m-trifluoromethylanilino)fluoran, 3-di-pentylamino-6-chloro-7-anilinofluoran, 3-di-pentylamino-7-(p-chloroanilino) fluoran, 3-pyrrolidino-6-methyl-7-anilinofluoran, 3-pyperidino-6-methyl-7-anilinofluoran, 3-(N-methyl-N-propylamino)-6-methyl-7-anilinofluoran, 3-(N-methyl-N-cyclohexylamino)-6-methyl-7-anilinofluoran, 3-(N-ethyl-N-cyclohexylamino)-6-methyl-7-anilinofluoran, 3-(N-ethyl-N-xylamino)-6-methyl-7-(p-chloroanilino)fluoran, 3-(N-ethyl-p-toluidino)-6-methyl-7-anilinofluoran, 3-(N-ethyl-N-isoamylamino)-6-methyl-7-anilinofluoran, 3-(N-ethyl-N-isoamylamino)-6-chloro-7-anilinofluoran, 3-(N-ethyl-N-tetrahydrofurfurylamino)-6-methyl-7-anilinofluoran, 3-(N-ethyl-N-isobutylamino)-6-methyl-7-anilinofluoran, 3-(N-ethyl-N-ethoxypropylamino)-6-methyl-7-anilinofluoran, 3-cyclohexylamino-6-chlorofluoran, 2-(4-oxahexyl)-3-dimethylamino-6-methyl-7-anilinofluoran, 2-(4-oxahexyl)-3-diethylamino-6-methyl-7-anilinofluoran, 2-(4-oxahexyl)-3-dipropylamino-6-methyl-7-anilinofluoran, 2-methyl-6-p-(p-dimethylaminophenyl)aminoanilinofluoran, 2-methoxy-6-p-(p-dimethylaminophenyl)aminoanilinofluoran, 2-chloro-3-methyl-6-p-(p-phenyl aminophenyl)aminoanilinofluoran, 2-chloro-6-p-(p-dimethylaminophenyl)aminoanilinofluoran, 2-nitro-6-p-(p-diethylaminophenyl)aminoanilinofluoran, 2-amino-6-p-(p-diethylaminophenyl)aminoanilinofluoran, 2-diethylamino-6-p-(p-diethylaminophenyl) aminoanilinofluoran, 2-phenyl-6-methyl-6-p-(p-phenylaminophenyl)aminoanilinofluoran, 2-benzyl-6-p-(p-phenylaminophenyl)aminoanilinofluoran, 2-hydroxy-6-p-(p-phenylaminophenyl)aminoanilinofluoran, 3-methyl-6-p-(p-dimethylaminophenyl)aminoanilinofluoran, 3-diethylamino-6-p-(p-diethylaminophenyl)aminoanilinofluoran, 3-diethylamino-6-p-(p-dibutylaminophenyl)aminoanilinofluoran, 2,4-dimethyl-6-[(4-dimethylamino)anilino]fluoran, 3,6-dimethoxyfluoran, 3-dimethylamino-7-methoxyfluoran, 3-diethylamino-6-methoxyfluoran, 3-diethylamino-7-methoxyfluoran, 3-diethylamino-6,7-dimethylfluoran, 3-N-cyclohexyl-N-n-butylamino-7-methylfluoran, 3-diethylamino-7-dibenzylaminofluoran, 3-diethylamino-7-octylaminofluoran, 3-diethylamino-7-di-n-hexylaminofluoran, 3-diethylamino-7-anilinolfluoran, 3,6-bis(diethylamino)fluoran-γ-(3'-nitro)anilinolactam, and 3,6-bis(diethylamino)fluoran-γ-(4'-nitro)anilinolactam.

Examples of the fluorene-based leuco dye include 3,6,6'-tris(dimethylamino)spiro[fluorene-9,3'-phthalide]; and 3,6,6'-tris(diethylamino)spiro[fluorene-9,3'-phthalide].

Examples of the divinyl-based leuco dye include 3,3-bis[2-(p-dimethylaminophenyl)-2-(p-methoxyphenyl)ethenyl]-4,5,6,7-tetrabromophthalide; 3,3-bis[2-(p-dimethylaminophenyl)-2-(p-methoxyphenyl)ethenyl]-4,5,6,7-tetrachlorophthalide; 3,3-bis[1,1-bis(4-pyrrolidinophenyl) ethylene-2-yl]-4,5,6,7-tetrabromophthalide; and 3,3-bis[1-(4-methoxyphenyl)-1-(4-pyrrolidinophenypethylene-2-yl]-4,5,6,7-tetrachlorophthalide.

Examples of the leuco dye also include azaphthalide-based leuco dyes, such as 3-(4-diethylamino-2-ethoxyphenyl)-3-(1-ethyl-2-methylindol-3-yl)-4-azaphthalide, 3-(4-diethylamino-2-ethoxyphenyl)-3-(1-octyl-2-methylindol-3-yl)-4-azaphthalide, 3-(4-cyclohexylethylamino-2-methoxyphenyl)-3-(1-ethyl-2-methylindol-3-yl)-4-azaphthalide, 3-(2-methyl-4-diethylaminophenyl)-3-(1-ethyl-2-methylindol-3-yl)-4-azaphthalide, 3-(2-n-propoxycarbonylamino-4-di-n-propylaminophenyl)-3-(1-ethyl-2-methylindol-3-yl)-4-azaphthalide, 3-(2-methyl amino-4-di-n-propylaminophenyl)-3-(1-ethyl-2-methylindol-3-yl)-4-azaphthalide, 3-(2-methyl-4-di-n-hexylaminophenyl)-3-(1-n-octyl-2-methylindol-3-yl)-4,7-diazaphthalide, 3,3-bis(2-ethoxy-4-diethylaminophenyl)-4-azaphthalide, 3,3-bis(1-n-octyl-2-methylindol-3-yl)-4-azaphthalide, 3-(2-ethoxy-4-diethylaminophenyl)-3-(1-ethyl-2-methylindol-3-yl)-4-azaphthalide, 3-(2-ethoxy-4-diethylaminophenyl)-3-(1-octyl-2-methylindol-3-yl)-4 or 7-azaphthalide, 3-(2-ethoxy-4-diethylaminophenyl)-3-(1-ethyl-2-methylindol-3-yl)-4 or 7-azaphthalide, 3-(2-hexyloxy-4-diethylaminophenyl)-3-(1-ethyl-2-methylindol-3-yl)-4 or 7-azaphthalide, 3-(2-ethoxy-4-diethylaminophenyl)-3-(1-ethyl-2-phenylindol-3-yl)-4 or 7-azaphthalide, and 3-(2-butoxy-4-diethylaminophenyl)-3-(1-ethyl-2-phenylindol-3-yl)-4 or 7-azaphthalide 3-methyl-spiro-dinaphthopyran.

Examples also include 3-(4-dimethylaminophenyl)-3-(1,2-dimethylindol-3-yl)phthalide, 3-(4-dimethylaminophenyl)-3-(2-methylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl-6-dimethylaminophthalide, 3,3-bis(2-phenylindol-3-yl)-6-dimethylaminophthalide, 3-(4-dimethylaminophenyl)-3-(1-methylpyrrol-3-yl)-6-dimethylaminophthalide, 3-[1,1-di(1-ethyl-2-methylindol-3-yl)ethylene-2-yl]-3-(4-diethylaminophenyl)phthalide, 3-[1,1-di(1-ethyl-2-methylindol-3-yl)ethylene-2-yl]-3-(4-N-ethyl-N-phenylaminophenyl)phthalide, 3-(2-ethoxy-4-diethylaminophenyl)-3-(1-n-octyl-2-methylindol-3-yl)-phthalide, 3,3-bis(1-n-octyl-2-methylindol-3-yl)-phthalide, and 3-(2-methyl-4-diethylaminophenyl)-3-(1-n-octyl-2-methylindol-3-yl)-phthalide.

Examples further include 3-ethyl-spiro-dinaphthopyran, 3-phenyl-spiro-dinaphthopyran, 3-benzyl-spiro-dinaphthopyran, 3-methyl-naphtho-(3-methoxybenzo)spiropyran, 2'-anilino-6'-(N-ethyl-N-isopentyl)amino-3'-methylspiro[isobenzofuran-1(3H),9'-(9H)xanthen-3-one, 2'-anilino-6'-(N-ethyl-N-(4-methylphenyl))amino-3'-methylspiro[isobenzofuran-1(3H),9'-(9H)xanthen]-3-one, 3'-N,N-dibenzylamino-6'-N,N-diethylaminospiro[isobenzofuran-1(3H),9'-(9H)xanthen]-3-one, and 2'-(N-methyl-N-phenyl)amino-6'-(N-ethyl-N-(4-methylphenyl))aminospiro[isobenzofuran-1(3H),9'-(9H)xanthen]-3-one.

As the colorant contained in the resin layer (A), one of the above components may be used alone or two or more components can be used in combination. When a colorant is contained in the resin layer (B), as the colorant contained in the resin layer (B), one of the above components may be used alone or two or more components can be used in combination. The colorant contained in the resin layer (B) may be the same compound as or may be a different compound from the colorant contained in the resin layer (A), but as each of the colorants contained in the resin layers (A) and (B), a colorant that binds to the developer contained in the resin layer (B) to react therewith, thereby being capable of developing a color is advantageously used.

[Developer]

As the developer, any compound that reacts with the colorant described above by heating to allow the colorant to develop a color is used. The developer generally has an electron accepting property, and the developer having an electron accepting property reacts with the basic leuco colorant described above.

The pyrolysis temperature of the developer is preferably 200° C. or higher. When the pyrolysis temperature of the developer is 200° C. or higher, the developer does not thermally decompose, for example, in forming the resin layer (B), and it is possible, in the multilayer body, to allow the colorant to properly develop a color by the developer. The pyrolysis temperature of the developer is, from the above point of view, more preferably 220° C. or higher, further preferably 240° C. or higher, and particularly preferably 260° C. or higher. The pyrolysis temperature of the developer is generally, but not particularly limited to, 370° C. or lower, and may be 365° C. or lower.

The crystalline melting temperature of the developer is preferably 100° C. or higher. When the crystalline melting temperature of the developer is 100° C. or higher, even if the multilayer body is exposed to a high temperature environment in forming a resin layer or in use of the multilayer body as a card, passport, or the like, bleeding of the developer on a surface is easily prevented. The crystalline melting temperature of the developer is, from the above point of view, more preferably 120° C. or higher, further preferably 130° C. or higher, and particularly preferably 140° C. or higher.

The crystalline melting temperature of the developer is preferably 300° C. or lower. When the crystalline melting temperature is 300° C. or lower, a good dispersibility of the developer is achieved in forming the resin layer (B) and uneven color development and deterioration in mechanical properties are less likely to occur. From the above point of view, the crystalline melting temperature of the developer is more preferably 280° C. or lower, further preferably 260° C. or lower, furthermore preferably 240° C. or lower, particularly preferably 220° C. or lower, and especially preferably 200° C. or lower.

In the resin layer (B), the developer may not be enclosed, for example, in a capsule or the like although with no limitation, and a compound described later itself that constitutes the developer may be dispersed or dissolved in the resin (b).

Preferable examples of the developer include a triazine compound, a bisphenol compound, a urea compound, a novolac phenol compound, and an organic halogen compound.

An example of the triazine compound is a compound represented by the following formula (4). The compound represented by the following formula (4) generally has a tautomer, and the triazine compound is at least any one of the compound represented by the following formula (4) and the tautomer thereof.

(4)

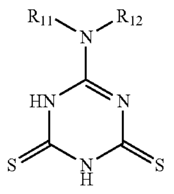

In the formula, $R_{11}$ and $R_{12}$ each independently represent a hydrogen atom, a saturated or unsaturated hydrocarbon group having 1 to 18 carbon atoms or a cycloalkyl group having 5 to 12 carbon atoms which may be substituted with a halogen atom, a cyano group, an alkoxy group, an alkoxycarbonyl group, or an acyloxy group, or an aryl group or an aralkyl group which may be substituted with a halogen atom or a lower alkyl group or a lower alkoxy group having 1 to 4 carbon atoms. $R_{11}$ and $R_{12}$ may from a heteroring together with an adjacent nitrogen atom.

Among them, from the viewpoint of color development sensitivity and storage stability, $R_{11}$ is preferably a chain hydrocarbon group having a branched structure and having 5 to 18 carbon atoms and $R_{12}$ is preferably a hydrogen atom or a hydrocarbon group having 1 to 4 carbon atoms. The number of carbon atoms of $R_{11}$ which is a chain hydrocarbon group is preferably 6 to 12, more preferably 7 to 10, and most preferably 8. $R_{12}$ is preferably a hydrogen atom or a hydrocarbon group having 1 to 2 carbon atoms, more preferably a hydrogen atom or a methyl group, and most preferably a hydrogen atom.

A preferred specific example of the triazine compound is 6-[(2-ethylhexyl)amino]-1,3,5-triazine-2,4(1H,3H)-dithione.

The compound represented by the formula (4) may become a compound having an —SH group as represented by the following formula (5) through tautomerization.

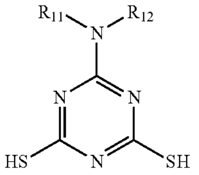

(5)

In the formula (5), $R_{11}$ and $R_{12}$ are the same as above.

Examples of the bisphenol compound include 4,4'-isopropylidenediphenol, 2,2'-bis(4-hydroxy-3-methylphenyl)propane, 1,1-bis(4-hydroxyphenyl)cyclohexane, 2,2-bis(4-hydroxyphenyl)-4-methylpentane, 4,4'-dihydroxydiphenylsulfide, di(4-hydroxy-3-methylphenyl) sulfide, 2,2'-thiobis(3-tert-octylphenol), 2,2'-thiobis(4-tert-octylphenol), 4,4'-dihydroxydiphenylsulfone, 2,4'-dihydroxy diphenylsulfone, 4-hydroxy-4'-n-propoxydiphenylsulfone, 4-hydroxy-4'-isopropoxy diphenylsulfone, 4-hydroxy-4'-allyloxydiphenylsulfone, bis (3-allyl-4-hydroxyphenyl)sulfone, 4-hydroxyphenyl-4'-benzyloxyphenylsulfone, 3,4-dihydroxyphenyl-4'-methylphenylsulfone, 2,4-bis(phenylsulfonyl)phenol, a bisphenol sulfone-crosslinked compound described in JP 3913820 B, and a bisphenol sulfone derivative described in JP 4004289 B.

Examples of the urea compound include amino acid derivatives, such as 4,4'-bis(3-(phenoxycarbonylamino) methylphenylureido)diphenylsulfone, N-(p-toluenesulfonyl)-N'-(3-p-toluenesulfonyloxyphenyl)urea described in JP 4601174 B, 4,4'-bis(3-tosylureido)diphenylmethane described in JP 2011-105638 A, N-[2-(3-phenylureido)phenyl]benzenesulfonamide described in JP 2016-165835 A, N-[2-(acetoxy)phenyl]-N'-phenylurea, N-[3-(acetoxy)phenyl]-N'-phenylurea, N-[2-(benzoyloxy)phenyl]-N'-phenylurea, and N-[3-(benzoyloxy)phenyl]-N'-phenylurea which are described in JP 2017-165091 A, N-(m-tolylaminocarbonyl)-phenylalanine, N-(p-toluenesulfonyl)-phenylalanine, N-(benzyloxycarbonyl)-valine, N-(m-tolylaminocarbonyl)-methionine, N-(m-tolylaminocarbonyl)-tyrosine, N-(m-tolylaminocarbonyl)-phenylglycine, N-(m-tolylaminocarbonyl)-valine, N-(m-tolylaminocarbonyl)-cysteine-S-benzyl, N-(m-tolylaminocarbonyl)-β-alanine, N-phenylaminothiocarbonyl-glycylglycine, N-(p-toluenesulfonylaminocarbonyl)-phenylalanine methyl ester, N-(p-toluenesulfonyl)-β-alanine, N-(p-tolylaminocarbonyl)-methionine, and N-(phenylaminocarbonyl)-methionine which are described in WO 2017/047572.

An example of the novolac phenol compound is a phenol-formalin condensate described in WO 02/098674.

Examples of the organic halogen compound include an aromatic halogen compound and an aliphatic halogen compound, and an aromatic halogen compound is preferred. Examples of the aromatic halogen compound include dibromobenzene, hexabromobenzene, pentabromotoluene, pentabromodiphenyl ether, dichlorobenzene, and hexachlorobenzene.

In addition to the compounds mentioned above, other examples of the developer include inorganic acidic substances, such as activated clay, attapulgite, colloidal silica, and aluminum silicate, hydroquinone monobenzyl ether, benzyl 4-hydroxybenzoate, an aminobenzene sulfonamide derivative described in JP 8-59603 A, bis(4-hydroxyphenylthioethoxy)methane, 1,5-di(4-hydroxyphenylthio)-3-oxapentane, butyl bis(p-hydroxyphenyl)acetate, methyl bis(p-hydroxyphenyl)acetate, 1,1-bis(4-hydroxyphenyl)-1-phenyl ethane, 1,4-bis[α-methyl-α-(4'-hydroxyphenyl)ethyl]benzene, 1,3-bis[α-methyl-α-(4'-hydroxyphenyl)ethyl]benzene, compounds described in WO 02/081229 and JP 2002-301873 A, a thiourea compound such as N,N'-di-m-chlorophenylthiourea, aromatic carboxylic acids and salts of the aromatic carboxylic acids with salts of polyvalent metals, such as zinc, magnesium, aluminum, calcium, titanium, manganese, tin, and nickel, such as p-chlorobenzoic acid, stearyl gallate, bis[zinc 4-(octyloxycarbonylamino)salicylate] dihydrate, 4-[2-(p-methoxyphenoxy)ethyloxy]salicylic acid, 4-[3-(p-tolylsulfonyl)propyloxyl]salicylic acid, and 5-[p-(2-p-methoxyphenoxyethoxy)cumyl]salicylic acid, and an antipyrine complex of zinc thiocyanate, and a zinc double salt of terephthalaldehydic acid and another aromatic carboxylic acid. An examples thereof is a metal chelate complex of a higher fatty acid metal double salt and a polyhydric hydroxy aromatic compound and the like as described in JP 10-258577 A.

In the present invention, as the developer contained in the resin layer (B), one of the above components may be used alone or two or more components can be used in combination. When a developer is contained in the resin layer (A), as the developer contained in the resin layer (A), one of the above components may be used alone or two or more components can be used in combination. The developer contained in the resin layer (A) may be the same compound as or a different compound from the developer contained in the resin layer (B), but both the developers contained in the resin layers (A) and (B) are each advantageously one that reacts with the colorant contained in the resin layer (A) to allow the colorant to develop a color.

[Photothermal Converting Agent]

The multilayer body of the present invention is preferably capable of developing a color by laser irradiation. Specifically, at least a part of the multilayer body may be heated by laser irradiation so that the developer and the colorant react by the heat to allow the colorant to develop a color. For such a configuration, for example, a photothermal converting agent may be incorporated in the multilayer body. The photothermal converting agent converts the photoenergy absorbed from laser irradiation to heat, to thus heat at least a part of the multilayer body.

In the present invention, at least one of the resin layer (A) and the resin layer (B) preferably contains a photothermal converting agent. In the multilayer body, by at least one of the resin layer (A) and the resin layer (B) containing a photothermal converting agent, at least one of the resin layer (A) and the resin layer (B) and the vicinity thereof are heated by laser irradiation and thus, the developer and the colorant are also heated. Thus, mainly at the interface between the resin layer (A) and the resin layer (B) or in the vicinity thereof (however, when there is the intermediate resin layer (C) described later, in the interior of the intermediate resin layer (C), at the interface between the resin layer (C) and at least one of the resin layer (A) and the resin layer (B), and in the vicinity thereof), the heated developer and colorant are allowed to react to develop a color.

The photothermal converting agent may be contained in the resin layer (A) or may be contained in the resin layer (B). The photothermal converting agent is more preferably contained in both of the resin layer (A) and the resin layer (B) from the viewpoint of quickly heating the developer and the colorant by laser irradiation to allow the colorant to develop a color.

The photothermal converting agent is not particularly limited, but, for example, may be a compound that absorbs light in a wavelength range of 300 to 3500 nm, preferably 350 to 3000 nm to generate heat. From the viewpoint of photothermal conversion efficiency, a near infrared absorbent that has the maximum value of an absorption peak in the wavelength range of 400 to 3000 nm is preferred. As the near infrared absorbent, an organic colorant is preferred. Examples of the organic colorant include a cyanine colorant, a phthalocyanine colorant, a naphthalocyanine colorant, a squarylium colorant, a quinone colorant, a polymethine colorant, a diimmonium colorant, an azo colorant, a phenylenediamine colorant, a diphenylmethane or triphenylmethane colorant, a pyrrolopyrrole colorant, and a metal complex colorant. Among them, in terms of superior durability, a phthalocyanine colorant, a diimmonium colorant, and a squarylium colorant are preferred.

The maximum value of an absorption peak of the photothermal converting agent is not particularly limited, but is preferably 300 to 2500 nm, and further preferably 400 to 2000 nm which gives a relatively high energy, furthermore preferably 500 to 1500 nm, furthermore preferably 580 to 1300 nm, and particularly preferably 650 to 1100 nm.

As the photothermal converting agent, a commercial product can also be used. Examples of the commercial product used as the photothermal converting agent include "ABS-626", "ABS-642", "ABS643", "ABS654", "ABS667", "ABS670T", "ABS-699", "IRA-677", "IRA693N", "IRA735", "IRA800", "IRA850", and "IRA868" (manufactured by Exciton Inc.); "TAP-15" and "IR-706" (manufactured by YAMADA CHEMICAL CO., LTD.); "PD-320", "YKR-2900", and "YKR-3080" (manufactured by Yamamoto Chemicals Inc.); "IR-1", "IR-10A", "IR-12", "IR-14", "TX-EX906B", and "TX-EX910B" (manufactured by NIPPON SHOKUBAI CO., LTD.); "Kayasorb IRG-068", "Kayasorb IRG-069", and "Kayasorb IRG-079" (manufactured by Nippon Kayaku Co., Ltd.); "CIR-1085" and "CIR-RL" (manufactured by Japan Carlit Co., Ltd.); and "Lumogen IR765" and "Lumogen IR788" (manufactured by BASF). Among them, in terms of low absorption in the visible light region, "IRA-677", "ABS-626", and "ABS-699" are preferred.

As the photothermal converting agent, a compound known as a so-called UV absorber which can be used as another additive as described later can also be used.

As the photothermal converting agent contained in each of the resin layers (A) and (B), one of the above components may be used alone or two or more components can be used in combination. When both the resin layers (A) and (B) contain a photothermal converting agent, the photothermal converting agent contained in the resin layer (A) may be the same compound as or a different compound from the colorant contained in the resin layer (B).

In a case where the resin layer (A) contains a photothermal converting agent, the content of the photothermal converting agent in the resin layer (A) relative to 100 parts by mass of the resin (a) is preferably 0.0005 parts by mass or more and 1 part by mass or less, more preferably 0.001 part by mass or more and 0.5 parts by mass or less, further preferably 0.003 parts by mass or more and 0.3 parts by mass or less, and particularly preferably 0.005 parts by mass or more and 0.1 part by mass or less. When the content of the photothermal converting agent in the resin layer (A) is 0.0005 parts by mass or more, the resin layer (A) or the vicinity thereof can be quickly heated by laser irradiation to allow the colorant to properly develop a color. When the content is 1 part by mass or less, an effect commensurate with the content can be achieved and the mechanical strength, transparency, and the like of the resin layer (A) are easily secured.

In a case where the resin layer (B) contains a photothermal converting agent, the content of the photothermal converting agent in the resin layer (B) is, from the same point of view as above, relative to 100 parts by mass of the resin (b), preferably 0.0005 parts by mass or more and 1 part by mass or less, more preferably 0.001 part by mass or more and 0.5 parts by mass or less, further preferably 0.003 parts by mass or more and 0.3 parts by mass or less, and particularly preferably 0.005 parts by mass or more and 0.1 part by mass or less.

[Sensitizer]

The resin layer (A) may contain a sensitizer. The resin layer (B) may contain a sensitizer. Either the resin layer (A) or the resin layer (B) may contain a sensitizer or both of them may contain a sensitizer.

The sensitizer is not particularly limited, but, for example, 1,2-di-(3-methylphenoxy)ethane, 2-benzyloxynaphthalene, a fatty acid amide having 10 to 21 carbon atoms (for example, stearamide or palmitamide), ethylene bisamide, montanic acid wax, polyethylene wax, p-benzylbiphenyl, diphenylsulfone, 4-biphenyl-p-tolyl ether, m-terphenyl, 1,2-diphenoxyethane, dibenzyl oxalate, di(p-chlorobenzyl) oxalate, di(p-methylbenzyl) oxalate, dibenzyl terephthalate, benzyl p-benzyloxybenzoate, di-p-tolyl carbonate, phenyl-α-naphthyl carbonate, 1,4-diethoxynaphthalene, 1-hydroxy-2-naphthoic acid phenyl ester, o-xylene-bis-(phenyl ether), 4-(m-methylphenoxymethyl)biphenyl, 4,4'-ethylene dioxy-bis-benzoic acid dibenzyl ester, dibenzoyloxymethane, 1,2-di(3-methylphenoxy)ethylene, bis[2-(4-methoxy-phenoxy)ethyl] ether, methyl p-nitrobenzoate, and phenyl p-toluenesulfonate can be used. Among them, 1,2-di-(3-methylphenoxy)ethane, 1,2-diphenoxyethane, a fatty acid amide having 10 to 21 carbon atoms (for example, stearamide or palmitamide), 2-benzyloxynaphthalene, diphenylsulfone, p-toluenesulfonamide, and oxalic acid di-p-methylbenzyl ester are preferred, and 1,2-di-(3-methylphenoxy)ethane which exhibits a high color development sensitivity even at a low energy is particularly preferred.

In each of the resin layers (A) and (B), as the sensitizer, only one compound may be used alone or two or more compounds may be used in combination. When both the resin layers (A) and (B) contain a sensitizer, the sensitizer contained in the resin layer (A) may be the same compound as or a different compound from the sensitizer contained in the resin layer (B).

When the resin layer (A) contains a sensitizer, the content of the sensitizer in the resin layer (A) is, relative to 100 parts by mass of the colorant contained in the resin layer (A), preferably 25 parts by mass or more and 250 parts by mass or less, and more preferably 50 to 150 parts by mass.

In a case where the resin layer (B) contains a sensitizer, the content of the sensitizer in the resin layer (B) is, relative to 100 parts by mass of the developer contained in the resin layer (B), preferably 25 to 250 parts by mass, and more preferably 50 to 150 parts by mass.

[Compound (X)]

The resin layer (A) may contain a compound (X) that has a first acid dissociation constant (pKa) of 9 or more. The resin layer (B) may contain a compound (X) that has a first acid dissociation constant (pKa) of 9 or more. Either the resin layer (A) or the resin layer (B) may contain the compound (X) or both of them may contain the compound (X). When at least one of the resin layers (A) and (B) contains the compound (X), in the resin layer that contains the compound (X), bleeding-out of a colorant or a developer tends to be easily suppressed.

The first acid dissociation constant (pKa) in the compound (X) is a value determined by using water at 25° C. as a solvent, and can be measured by, for example, a method described in The Journal of Physical Chemistry vol. 68, number 6, page 1560 (1964) or a method using an automatic potentiometric titrator (COM-980Win etc.) manufactured by HIRANUMA Co., Ltd. The acid dissociation exponents shown in Kagaku Binran edited by The Chemical Society of Japan (revised 3rd edition, Jun. 25, 1984, published by Maruzen Publishing Co., Ltd.), the values in a database pKaBASE available from CompuDrug Ltd., and the like can be used. Note that the first acid dissociation constant (pKa) in a compound that undergoes multi-step electrolytic dissociation refers to the pKa value at the first electrolytic dissociation.

Specific examples of the compound (X) include metal hydroxides, such as sodium hydroxide, potassium hydroxide, rubidium hydroxide, and cesium hydroxide; organic ammonium salts, such as tetramethylammonium hydroxide (TMAH), ammonium acetate, and ammonium formate; organic potassium salts, such as potassium acetate and potassium formate; various amines, for example, alkanolamines, such as monoethanolamine, diethanolamine, triethanolamine, N-methylethanolamine, N-methyl-N,N-diethanolamine, N,N-dimethylethanolamine, N,N-diethylethanolamine, N,N-dibutylethanolamine, N-(β-aminoethypethanolamine, N-ethylethanolamine, monopropanolamine, dipropanolamine, tripropanolamine, monoisopropanolamine, diisopropanolamine, and triisopropanolamine; primary amines, such as methylamine, ethylamine, propylamine, butylamine, pentylamine, and 1,3-propanediamine; secondary amines, such as piperidine and piperazine; and tertiary amines, such as trimethylamine and triethylamine ammonia; and ammonia. Other examples thereof include potassium iodide, sodium thiosulfate, iron oxide, tin chloride, sodium cyanoborohydride, lithium borohydride, and sodium borohydride.

As the compound (X), one of the compounds may be used alone or two or more thereof may be used in mixture.

Among them, the compound (X) is more preferably at least one selected from the group consisting of sodium hydroxide, potassium hydroxide, ammonia, ammonium acetate, potassium acetate, ammonium formate, and potassium formate, and most preferably potassium acetate.

In a case where the resin layers (A) and/or (B) contain the compound (X), the content of the compound (X) in each of the resin layers (A) and (B) is, relative to 100 parts by mass of the resin (the resin (a) or the resin layer (b)) constituting each resin layer, preferably 0.001 part by mass or more and 10 parts by mass or less, more preferably 0.002 parts by mass or more and 5 parts by mass or less, further preferably 0.003 parts by mass or more and 3 parts by mass or less, and particularly preferably 0.005 parts by mass or more and 1 part by mass or less.

[Other Additives]

Each of the resin layers (A) and (B) may contain, in addition to the above components, one or more additives (other additives) selected from a heat stabilizer, an antioxidant, a UV absorber, and the like. Into the resin layers (A) and (B), a known additive other than those additives can be appropriately incorporated.

(Heat Stabilizer)

By incorporating a heat stabilizer in either the resin layers (A) or (B) or both, the heat stability of each resin layer can be increased. An example of the heat stabilizer is a phosphorus compound. As the phosphorus compound, a known one can be used. Specific examples thereof include oxoacids of phosphorus, such as phosphoric acid, phosphonic acid, phosphorous acid, phosphinic acid, and polyphosphoric acid, acidic pyrophosphoric acid metal salts, such as acidic sodium pyrophosphate, acidic potassium pyrophosphate, and acidic calcium pyrophosphate, a Group 1 or Group 2B metal phosphoric acid salt, such as potassium phosphate, sodium phosphate, cesium phosphate, and zinc phosphate, an organic phosphite compound, an organic phosphate compound, and an organic phosphonite compound. In addition, a metal salt of an organic phosphate compound, an organic phosphite compound, an organic phosphonite compound, or the like may be used.

Examples of the organic phosphite compound include various phosphorous acid esters, such as triphenyl phosphite, tris(monononylphenyl) phosphite, tris(monononyl/dinonyl-phenyl) phosphite, tris(2,5-di-tert-butylphenyl) phosphite, tris(2,4-di-tert-butylphenyl) phosphite, tris[2,4-bis(1,1-dimethylpropyl)phenyl] phosphite, tris(mono-/di-tert-butyl phenyl) phosphite, monooctyldiphenyl phosphite, dioctylmonophenyl phosphite, monodecyldiphenyl phosphite, didecylmonophenyl phosphite, tridecyl phosphite, trilauryl phosphite, tristearyl phosphite, 2,2-methylenebis(4,6-di-tert-butylphenyl)octyl phosphite, 4,4'-butylidene-bis(3-methyl-6-t-butylphenyl-di-tridecyl phosphite), cyclic neopentanetetraylbis(2,6-di-t-butyl-4-methylphenyl phosphite), and 3,9-bis(2,6-di-tert-butyl-4-methylphenoxy)-2,4,8,10-tetraoxa-3,9-diphosphaspiro[5,5]undecane. Among them, a trialkyl phosphite such as tristearyl phosphite is preferred.

As the organic phosphite compound, a phosphorous acid ester having at least one oxetane group can also be used. Such an oxetane group-containing phosphorous acid ester may have one, two, or three oxetane groups.

Examples of the oxetane group-containing phosphorous acid ester include tris[(3-ethyloxetan-3-yl)methyl] phosphite, bis[(3-ethyloxetan-3-yl)methyl] phosphite, mono[(3-ethyloxetan-3-yl)methyl] phosphite, tris[(3-pentyloxetan-3-yl)methyl] phosphite, bis[(3-pentyloxetan-3-yl)methyl] phosphite, tris[(3-hexadecyloxetan-3-yl)methyl] phosphite, bis[(3-hexadecyloxetan-3-yl)methyl] phosphite, tris[(3-phenyloxetan-3-yl)methyl] phosphite, bis[(3-phenyloxetan-3-yl)methyl] phosphite, tris[(3-p-tolyloxetan-3-yl)methyl] phosphite, bis[(3-p-tolyloxetan-3-yl)methyl] phosphite, tris[(3-benzyloxetan-3-yl)methyl] phosphite, bis[(3-benzyloxetan-3-yl)methyl] phosphite, phenylbis[(3-ethyloxetan-3-yl)methyl] phosphite, 2-phenoxyspiro(1,3,2-dioxaphosphorinane-5,3'-oxetane), 3,3-bis[spiro(oxetane-3',5"-(1",3",2"-dioxa-2"-phosphorinane))-oxymethyl]oxetane, and P,P'-[(1-methylethylidene)-di-4,1-phenylene]-P,P,P',P'-tetrakis[(3-ethyl-3-oxetanyl)methyl] phosphite. An oxetane group-containing phosphorous acid ester described in U.S. Pat. No. 3,209,013 B can be appropriately used. By using such an oxetane group-containing phosphorous acid ester, the color intensity after color development by the colorant is easily increased.

The organic phosphate compound is preferably an organic phosphoric acid ester compound or a metal salt of an organic phosphoric acid ester compound. As the metal, at least one metal selected from Group Ia, IIa, IIb, IIIa, and IIIb in the periodic table is more preferred, and among them, magnesium, barium, calcium, zinc, or aluminum is further preferred, and magnesium, calcium, or zinc is particularly preferred.

As the organic phosphoric acid ester compound, an acidic organic phosphoric acid ester and a metal salt thereof are preferred. Examples of the acidic organic phosphoric acid ester include a dialkyl acid phosphate, a monoalkyl acid phosphate, a diaryl acid phosphate, and a monoalkyl monoaryl acid phosphate, and among them, a dialkyl acid phosphate or a monoalkyl acid phosphate is preferred. The alkyl group in the acidic organic phosphoric acid ester may be, for example, an alkyl group having 1 to 30 carbon atoms, and the number of carbon atoms of the alkyl group is preferably 2 to 25, and more preferably 6 to 23. The number of carbon atoms of the aryl group may be about 6 to 30.

Preferred specific examples of the organic phosphoric acid ester compound include bis(distearyl acid phosphate) zinc salt, monostearyl acid phosphate zinc salt, tris(distearyl acid phosphate) aluminum salt, a salt of monostearyl acid phosphate and two monostearyl acid phosphate aluminum salts, monostearyl acid phosphate, and distearyl acid phosphate. Among them, bis(distearyl acid phosphate) zinc salt or monostearyl acid phosphate zinc salt is more preferred.

Examples of the organic phosphonite compound include tetrakis(2,4-di-iso-propylphenyl)-4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenyl ene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis (2,6-di-tert-butylphenyl)-4,4'-biphenylene diphosphonite, tetrakis(2,6-di-tert-butylphenyl)-4,3'-biphenylene diphosphonite, and tetrakis(2,6-di-tert-butylphenyl)-3,3'-biphenylene diphosphonite.

Among the phosphorus compounds, from the viewpoint of increasing heat stability and suppressing oxidation, an organic phosphite compound is preferred. In addition, combination use of an organic phosphite compound and an antioxidant as described later is preferred, and specifically, combination use with a phenol-based antioxidant is preferred. By combination use with a phenol-based antioxidant, reduction in the molecular weight and yellowing of the resin in extrusion-film-formation can be effectively suppressed. Stability in extrusion-film-formation and long-term stability as a formed product (multilayer body) can be simultaneously achieved.

The phosphorus compound can be also used as a transesterification inhibitor which can inhibit transesterification reaction of a polyester resin and a polycarbonate resin. Accordingly, when either the resin (a) or the resin (b) contains a polyester resin and the other of the resin (a) or the resin (b) contains a polycarbonate resin, or when a polyester resin and a polycarbonate resin are used in combination in either the resin (a) or the resin (b) or in each of both the resin (a) and the resin (b), by using the phosphorus compound, the transesterification reaction can be suppressed to further increase the heat stability. In use as a passport or a card, transesterification with a polyester resin or a polycarbonate resin that constitutes a layer adjacent to the multilayer body, such as a core sheet or a protective layer as described later, can also be suppressed. Among the phosphorus compounds described above, the organic phosphate compound is preferred in terms of capability of inhibiting the transesterification reaction.

In each of the resin layers (A) and (B), one of the heat stabilizers may be used alone or two or more thereof may be used in combination. When both the resin layers (A) and (B) contain a heat stabilizer, the heat stabilizer contained in the resin layer (A) may be the same compound as or a different compound from the heat stabilizer contained in the resin layer (B).

When each of the resin layers (A) and (B) contains a heat stabilizer, the content of the heat stabilizer in each of the resin layers (A) and (B) is, relative to 100 parts by mass of the resin (resin (a) or resin layer (b)) constituting each resin layer, preferably 0.001 part by mass or more and 5 parts by mass or less, more preferably 0.01 part by mass or more and 1 part by mass or less, further preferably 0.05 parts by mass or more and 0.7 parts by mass or less, and particularly preferably 0.1 part by mass or more and 0.5 parts by mass or less.

[Antioxidant]

As the antioxidant, for example, a phenol-based antioxidant, a sulfur-based antioxidant, and the like can be used. Among them, a phenol-based antioxidant is preferred. The antioxidant may be incorporated in any one of the resin layer (A) and the resin layer (B) or may be incorporated in the both.

Examples of the phenol-based antioxidant include α-tocopherol, 4-methoxyphenol, 4-hydroxyphenyl (meth)acrylate, β-tocopherol, 2,6-di-tert-butylphenol, 2,6-di-tert-4-methoxyphenol, 2-tert-butyl-4-methoxyphenol, 2,4-dimethyl-6-tert-butylphenol, 2,6-di-tert-butyl-4-methylphenol (dibutylhydroxytoluene, BHT), and stearyl-O-(3,5-di-tert-butyl-4-hydroxyphenyl) propionate. Among them, 2,6-di-tert-butyl-4-methylphenol (dibutylhydroxytoluene, BHT) is preferred.

Examples of the sulfur-based antioxidant include thiodipropionic acid, dilauryl thiodipropionate, distearyl thiodipropionate, laurylstearyl thiodipropionate, dimyristyl thiodipropionate, distearyl β,β'-thiodibutylate, thiobis(β-naphthol), thiobis(N-phenyl-β-naphthylamine, 2-mercaptobenzothiazole, 2-mercaptobenzoimidazole, tetramethyltiuram monosulfide, tetramethyltiuram disulfide, and nickel dibutyldithiocarbamate.

In each of the resin layer (A) and the resin layer (B), one of the antioxidants may be used alone or two or more thereof may be used in combination. When both the resin layers (A) and (B) contain an antioxidant, the antioxidant contained in the resin layer (A) may be the same compound as or a different compound from the antioxidant contained in the resin layer (B).

When each of the resin layers (A) and (B) contains an antioxidant, the content of the antioxidant in each of the resin layers (A) and (B) is, relative to 100 parts by mass of the resin (resin (a) or resin layer (b)) constituting each resin layer, preferably 0.01 part by mass or more and 4 parts by mass or less, more preferably 0.03 parts by mass or more and 2 parts by mass or less, further preferably 0.05 parts by mass or more and 1 part by mass or less, and particularly preferably 0.08 parts by mass or more and 0.5 parts by mass or less.

[UV Absorber]

The resin layer (A) may contain a UV absorber. The resin layer (B) may contain a UV absorber. Either the resin layer (A) or the resin layer (B) may contain a UV absorber or both of them may contain a UV absorber. By incorporating a UV absorber in at least one of the resin layer (A) and the resin layer (B), the light resistance and weather resistance can be increased, and photodegradation of a card or a passport produced using the multilayer body can be suppressed.

As the UV absorber, an organic UV absorber, such as a benzotriazole-based UV absorber, a hydroxyphenyltriazine-based UV absorber, or a cyclic imino ester-based UV absorber, can be used.

As the benzotriazole-based UV absorber, for example, 2-(2'-hydroxy-5'-methylphenyl)benzotriazole, 2-(2'-hydroxy-3',5'-di-t-amylphenyl)benzotriazole, 2-(2'-hydroxy-3', 5'-di-t-butylphenyl)-benzotriazole, 2-(2'-hydroxy-3',5'-bis(α,α'-dimethylbenzyl)phenylbenzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-5'-tert-octylphenyl)benzotriazole, 2,2'-methylenebis[4-(1,1,3,3-tetramethylbutyl)-6-(2H-benzotriazol-2-yl)phenol], and compounds represented by methyl-3-[3-t-butyl-5-(2H-benzotriazol-2-yl)-4-hydroxyphenylpropionate-polyethylene glycol, condensate product can be exemplified.

As the hydroxyphenyltriazine-type UV absorber, for example, 2-(4,6-diphenyl-1,3,5-triazin-2-yl)-5-hexyloxyphenol and 2-(4,6-bis(2,4-dimethylphenyl)-1,3,5-triazin-2-yl)-5-hexyloxyphenol can be exemplified.

As the cyclic imino ester-based UV absorber, for example, 2,2'-p-phenylene bis(3,1-benzoxazin-4-one), 2,2'-m(2)-phenylene bis(3,1-benzoxazin-4-one), and 2,2'-4,4'-diphenylene bis(3,1-benzoxazin-4-one) can be exemplified.

In addition, as the UV absorber, besides, an organic UV absorber, such as a benzophenone-based UV absorber, a salicylate-based UV absorber, a cyanoacrylate compound, an oxanilide-based UV absorber, or a malonic acid ester-based UV absorber, can be used. An inorganic UV absorber, such as cerium oxide or zinc oxide, can also be used.

For increasing light stability, a hindered amine-based, a nickel-based, a benzoate-based photostabilizer can also be used.

In each of the resin layers (A) and (B), one of the UV absorbers may be used alone or two or more thereof may be used in combination. When both the resin layers (A) and (B) contain a UV absorber, the UV absorber contained in the resin layer (A) may be the same compound as or a different compound from the UV absorber contained in the resin layer (B).

In the case where each of the resin layers (A) and (B) contains a UV absorber, the content of the UV absorber in each of the resin layers (A) and (B) is, relative to 100 parts by mass of the resin (resin (a) or resin (b)) constituting each resin layer, preferably 0.001 part by mass or more and 5 parts by mass or less, more preferably 0.01 part by mass or more and 1 part by mass or less, further preferably 0.05 parts by mass or more and 0.7 parts by mass or less, and particularly preferably 0.1 part by mass or more and 0.5 parts by mass or less.

The photostabilizer can be used in the same manner as the UV absorber.

<Layer Structure>

As described above, the multilayer body of the present invention has the resin layer (A) and the resin layer (B). In an embodiment, the resin layer (B) is preferably directly laminated on one surface of the resin layer (A). By the resin layer (B) being directly laminated on the resin layer (A) without any layer interposed therebetween, when the multilayer body is heated by laser irradiation or the like, for example, at the interface between the resin layer (B) and the resin layer (A) and in the vicinity thereof, the developer in the resin layer (B) efficiently reacts with the colorant in the resin layer (A) to allow the colorant in the resin layer (A) to develop a color, thus enabling marking in a high color developing property.

However, the intermediate resin layer (C) may be provided between the resin layer (A) and the resin layer (B). When the intermediate resin layer (C) is provided, the colorant in the resin layer (A) and the developer in the resin layer (B) appropriately transfer in the intermediate resin layer (C) in heating the multilayer body by laser irradiation or the like, and the colorant and the developer react in the interior of the intermediate resin layer (C), at the interface between the intermediate resin layer (C) and the resin layer (A) or the resin layer (B), or in the vicinity thereof, to develop a color.

By providing the intermediate resin layer (C), since a reaction of the developer in the resin layer (B) with the colorant in the resin layer (A) in forming the multilayer body is prevented by the intermediate resin layer (C), improper color development of the colorant in forming the multilayer body can be effectively prevented.

A plurality of resin layers to be provided in the multilayer body are integrally formed. Accordingly, the resin layer (A) and the resin layer (B) that are directly laminated as described above are bonded to each other. When the intermediate resin layer (C) is to be provided, the resin layer (A) and the resin layer (B) are advantageously bonded via the intermediate resin layer (C).

The resin (c) used in the intermediate resin layer (C) may be a thermosetting resin or a thermoplastic resin, but is preferably a thermoplastic resin. That is, all the resin (a), the resin (b), and the resin (c) are each preferably a thermoplastic resin.

By using a thermoplastic resin in the intermediate resin layer (C), kneading, extrusion, and the like can be easily performed, and the formability of the intermediate resin layer (C) is enhanced. By using a thermoplastic resin as all the resin (a), the resin (b), and the resin (c), the resin layer (A), the intermediate resin layer (C), and the resin layer (B) can be easily laminated to produce a multilayer body.

Regarding specific examples of the thermoplastic resin to be used in the resin (c), the details are the same as for the thermoplastic resin used as the resin (a) and the resin (b) as described above.

In the intermediate resin layer (C), as long as the effect achieved by providing the intermediate resin layer (C) can be appropriately exhibited, either a colorant or a developer or both of them may be blended in small amounts, but from the viewpoint of more properly preventing improper color development of the colorant in forming the multilayer body, none of a colorant and a developer is preferably blended. The content of a colorant in the intermediate resin layer (C) is, relative to 100 parts by mass of the resin (c), for example, less than 0.5 parts by mass, preferably 0.35 parts by mass or less, more preferably 0.2 parts by mass or less, further preferably 0.1 part by mass or less, furthermore preferably 0.05 parts by mass or less, and particularly preferably 0.03 parts by mass or less. The content of a developer in the intermediate resin layer (C) is, relative to 100 parts by mass of the resin (c), for example, less than 0.5 parts by mass, preferably 0.35 parts by mass or less, more preferably 0.2 parts by mass or less, further preferably 0.1 part by mass or less, furthermore preferably 0.05 parts by mass or less, and particularly preferably 0.03 parts by mass or less.

The intermediate resin layer (C) may appropriately contain an additive other than colorants and developers. Regarding the additive other than colorants and developers used in the resin (c), the details are the same as for the additives used in the resin (a) and the resin (b) described above.

In the multilayer body, the resin layer (A) and the resin layer (B) may each be of one layer, but a plurality of layers may be provided as at least one of the resin layer (A) and the resin layer (B). For example, two resin layers (B) may be provided, the resin layers (B) being provided respectively on the two surfaces of the resin layer (A). Alternatively, two resin layer (A) may be provided, the resin layers (A) being provided respectively on the two surfaces of the resin layer (B).

A plurality of layers may be provided as each of the resin layers (A) and (B). When a plurality of layers are provided as each thereof, the resin layers (A) and the resin layers (B) may be alternately provided, for example.

In this case, the plurality of resin layers (A) may have respective colorants that respectively develop colors different from one another. For example, when each resin layer (B) contains a photothermal converting agent, the respective photothermal converting agents contained in the resin layers (B) advantageously respectively have absorption wavelengths (for example, the wavelengths corresponding to the maximum value of an absorption peak) that are different from one another. When the respective photothermal converting agents in the resin layers (B) have different absorption wavelengths from one another, which resin layer (A) develops a color among the plurality of resin layers (A) can be controlled by changing the wavelength of laser light with which the multilayer body is irradiated, making it possible to develop various colors. Similarly, for example, when each resin layer (A) contains a photothermal converting agent, the respective photothermal converting agents contained in the resin layers (A) advantageously have different absorption wavelengths (for example, wavelengths corresponding to the maximum value of an absorption peak) from one another.

A plurality of layers are provided as either the resin layer (A) or the resin layer (B) or both of them, a resin layer (A) and a resin layer (B) that are adjacent to each other are preferably directly laminated without another layer interposed therebetween, but the intermediate resin layer (C) may be appropriately provided therebetween.

The thickness of the resin layer (A) is not particularly limited, but is preferably 1 μm or more, more preferably more than 6 μm, further preferably 10 μm or more, furthermore preferably 20 μm or more, and particularly preferably 30 μm or more. When the thickness of the resin layer (A) is the lower limit or more, a multilayer body having a sufficient strength can be obtained. This enables suitable use as a passport or a card.

The thickness of the resin layer (A) is not particularly limited, but preferably 300 μm or less, more preferably 200 μm or less, further preferably 170 μm or less, furthermore preferably 150 μm or less, and particularly preferably 130 μm or less. When the thickness of the resin layer (A) is the upper limit or less, a good color developing property can be achieved without increasing the thickness of the multilayer body more than the necessary.

The thickness of the resin layer (B) is not particularly limited, but is preferably 1 μm or more, more preferably more than 6 μm, further preferably 10 μm or more, furthermore preferably 20 μm or more, furthermore preferably 30 μm or more, and particularly preferably more than 30 μm. When the thickness of the resin layer (B) is the lower limit or more, a multilayer body having a sufficient strength can be obtained.

The thickness of the resin layer (B) is not particularly limited, but is preferably 300 μm or less, more preferably 200 μm or less, further preferably 170 μm or less, furthermore preferably 150 μm or less, and particularly preferably 130 μm or less. When the thickness of the resin layer (B) is the upper limit or less, a good color developing property can be achieved without increasing the thickness of the multilayer body more than the necessary.

In a case where the intermediate resin layer (C) is provided, the thickness of the intermediate resin layer (C) is not particularly limited, but is preferably 1 μm or more and 200 μm or less. When the thickness of the intermediate resin layer (C) is within the above range, it is possible to allow at least any of the colorant or the developer to properly transfer into the intermediate resin layer (C) while preventing improper color development of the colorant contained in the resin layer (A) in production, and to allow the colorant to properly develop a color in marking. From the above point of view, the thickness of the intermediate resin layer (C) is preferably 5 μm or more and 150 μm or less, further preferably 10 μm or more and 100 μm or less, and particularly preferably 15 μm or more and 80 μm or less.

The thickness of the whole multilayer body is not particularly limited, but, from the viewpoint of ensuring the thickness of the each resin layer without increasing the thickness more than the necessary, the thickness is preferably 2 μm or more and 2000 μm or less, more preferably 10 μm or more and 1500 μm or less, further preferably 30 μm or more and 1200 μm or less, furthermore preferably 50 μm or more and 1000 μm or less, particularly preferably 80 μm or more and 900 μm or less, and especially preferably 100 μm or more and 800 μm or less.

The size of the multilayer body differs depending on the use purpose. For example, for use in a passport, the area of the multilayer body is preferably 400 $cm^2$ or less, more preferably 350 $cm^2$ or less, further preferably 300 $cm^2$ or less, furthermore preferably 250 $cm^2$ or less, furthermore preferably 200 $cm^2$ or less, and particularly preferably 150 $cm^2$ or less, and is preferably 50 $cm^2$ or more, more preferably 65 $cm^2$ or more, and further preferably 80 $cm^2$ or more.

For example, for use in a passport, the shape is preferably a quadrangle such as a rectangular shape, and the length of one side is preferably 20 cm or less, more preferably 18 cm or less, further preferably 16 cm or less, and furthermore preferably 14 cm or less, and is preferably 8 cm or more, more preferably 10 cm or more, and further preferably 11 cm or more. The length of another side is preferably 15 cm or less, more preferably 13 cm or less, further preferably 11 cm or less, and further preferably 10 cm or less, and is preferably 6 cm or more, more preferably 7 cm or more, and further preferably 8 cm or more. By the multilayer body having such a size and shape, the multilayer body can be suitably used as a passport, further, as an electric passport, in particular, as a data page thereof.

When the multilayer body is used, for example, in a card, the area thereof is also preferably 200 $cm^2$ or less, more preferably 150 $cm^2$ or less, further preferably 100 $cm^2$ or less, furthermore preferably 80 $cm^2$ or less, and particularly preferably 60 $cm^2$ or less, and is preferably 20 $cm^2$ or more, and more preferably 30 $cm^2$ or more.

The shape is preferably a quadrangle such as a rectangular shape, and the length of one side is preferably 17 cm or less, more preferably 15 cm or less, further preferably 13 cm or less, and particularly preferably 11 cm or less, and is preferably 6 cm or more, and more preferably 7.5 cm or more.

The length of another side is preferably 14 cm or less, more preferably 12 cm or less, further preferably 10 cm or less, and particularly preferably 8 cm or less, and is preferably 4 cm or more, and more preferably 4.5 cm or more.

By the multilayer body having such a size and shape, the multilayer body can be suitably used as a card.

The multilayer body preferably has a high transparency, and the total transmittance according to JIS K7361-1:1997 is preferably 84% or more, more preferably 86% or more, further preferably 88% or more, particularly preferably 90% or more, and most preferably 92% or more. By increasing the transparency of the multilayer body, the contrast between a part with marking and the other part can be increased.

<Method of Producing Multilayer Body>

The method for producing the multilayer body is not particularly limited, and the multilayer body can be produced by a known method. An example in which a thermoplastic resin is used as a resin constituting each resin layer will be described below.

Specifically, a resin (the resin (a) or the resin (b)) constituting each resin layer (for example, the resin layer (A) or the resin layer (B)) and other components (for example, at least a colorant in the resin layer (A) and at least a developer in the resin layer (B)) are first melt-kneaded in an extruder, a plastomill, or the like to obtain a resin composition for forming the resin layer, then, the resin composition is formed into a film, and the resin layers (for example, the resin layer (A) and the resin layer (B)) in the film form are laminated to produce a multilayer body. Here, the method of forming a resin composition into a film is not particularly limited, and may be press-molding or extrusion. In terms of productivity and cost, extrusion is preferred. By using such a production method, as compared with a coating method using a paint or the like, there is an advantage in that the adaptability to a secondary processing, such as shaping or bending, of the multilayer body is increased.

The method of laminating a plurality of resin layers (for example, the resin layer (A) and the resin layer (B)) formed in a film form is not particularly limited, but the plurality of resin layers formed in a film form produced in advance, may be laminated by a known lamination method, or on a resin layer formed in a film form, a resin composition for forming another resin layer may be melt-extruded (that is, by an extrusion method) to laminate the layers. In a lamination method, for example, layers may be allowed to pass between a pair of rolls while transporting each layer by a roll-to-roll process to thus laminate a plurality of resin layers. Alternatively, a plurality of resin layers may be pressed with a press machine or the like to laminate the layers. The press may be any of pressure press, vacuum heat press, and the like, but vacuum heat press is preferred.

The extrusion method may be a co-extrusion method. Specifically, a resin composition for forming each resin layer may be obtained in the same manner as the above, and the resin compositions may be melt-co-extruded by a feed block system, a multi-manifold system, or the like to obtain a multilayer body.

Among the above methods, the multilayer body is preferably produced by using a melt-co-extrusion in terms of the productivity and cost.

In this production method, the resin layer (B) may be directly laminated on the resin layer (A) to obtain a multilayer body, or the resin layer (A), the intermediate resin layer (C), and the resin layer (B) may be laminated to obtain a multilayer body including the intermediate resin layer (C).

The temperature in kneading the components for obtaining a resin composition is, from the viewpoint of increasing the dispersibility of the colorant and the developer to be blended, preferably a temperature that is equal to or higher than the crystalline melting temperatures of the colorant and the developer to be blended and is lower than the pyrolysis temperatures thereof. Although the proper kneading temperature differs depending on the type of the resin (a) and the resin (b), the kneading temperature is specifically, for example, 130° C. or higher and 300° C. or lower, preferably 150° C. or higher and 270° C. or lower, and more preferably 175° C. or higher and 250° C. or lower.

The temperature in forming the resulting resin composition into a resin layer in a film form by extrusion or press-molding is not particularly limited, but is, for example, 80° C. or higher and 300° C. or lower, preferably 100° C. or higher and 270° C. or lower, and more preferably 150° C. or higher and 250° C. or lower.

The temperature and pressure in laminating a plurality of resin layers are advantageously such a temperature and a pressure that the colorant blended in the resin layer (A) does not develop a color by the developer blended in the resin layer (B). For example, in the case of lamination by extrusion, such as co-extrusion, co-extrusion is advantageously performed at a proper temperature in view of the types of the resins, colorant, and developer used to obtain a multilayer body. In lamination by a lamination method, heat press bonding is advantageously performed at a temperature in the above range, but at a too high pressure, the colorant in the resin layer (A) may react with the developer in the resin layer (B) to develop a color even in a temperature within the above range, and thus, the pressure may be appropriately adjusted.

The temperature in laminating a plurality of resin layers (at least the resin layer (A) and the resin layer (B)) is not particularly limited, but is preferably lower than the crystalline melting temperature of at least one of the colorant contained in the resin layer (A) and the developer contained in the resin layer (B), and more preferably lower than both the crystalline melting temperatures of the colorant and the developer. The layers are advantageously heated to a temperature higher than the glass transition temperatures of the resin (a) and the resin (b). When lamination is performed at a temperature higher than the glass transition temperatures of the resin layer (A) and the resin layer (B) and lower than the crystalline melting temperature of the colorant or the developer, the resin layer (A) and the resin layer (B) are easily properly laminated while preventing color development.

In a case where the resin (a) and the resin (b) are a crystalline resin, the layers are advantageously heated preferably to a temperature around the crystalline melting temperatures of the resin (a) and the resin (b), or preferably to a temperature of the crystalline melting temperatures or higher. When lamination is performed at a temperature around the crystalline melting temperatures of the resin layer (A) and the resin layer (B) or a temperature of the crystalline melting temperatures or higher, and lower than the crystalline melting temperature of the colorant or the developer, the resin layer (A) and the resin layer (B) are easily properly laminated while preventing color development.

The temperature in laminating the resin layer (A) and the resin layer (B) is, for example, or higher and 250° C. or lower, preferably 100° C. or higher and 200° C. or lower, and more preferably 120° C. or higher and 170° C. or lower.

<Method of Using Multilayer Body>

The multilayer body of the present invention can be used as a marking sheet in which marking is applied by color development of the colorant in the resin layer (A). As described above, the multilayer body of the present invention can preferably develop a color by laser irradiation, and thus, is preferably used as a laser marking sheet.

The multilayer body of the present invention is advantageously allowed to develop a color by irradiation with laser light of a wavelength corresponding to the absorption wavelength of a photothermal converting agent contained in the multilayer body, for example. Specifically, for example, the multilayer body is advantageously allowed to develop a color by irradiation with laser light having a peak wavelength of 300 to 3500 nm, preferably 400 to 3000 nm, more preferably 500 to 2500 nm, further preferably 550 to 2000 nm, furthermore preferably 600 to 1500 nm, furthermore preferably 620 to 1300 nm, and particularly preferably 650 to 1100 nm. By properly selecting the types of the colorant, developer, photothermal converting agent used, marking of a desired color can be achieved.

The multilayer body of the present invention can also be used for an application other than a laser marking sheet, and, for example, may be used as a thermosensitive recording sheet which develops a color by heat or a pressure- and thermo-sensitive recording sheet which develops a color by heat and pressure.

The multilayer body of the present invention can be used in a passport or various cards, such as an IC card, a magnetic card, a driver's license, a residence card, a qualification certificate, an employee ID card, a student ID card, an individual number card, a seal registration certificate, an automobile inspection certificate, a tag card, a prepaid card, a cash card, a banking card, a credit card, a SIM card, an ETC card, a selector card, an information career card, a smart card, a B-CAS card, and a memory card. In various cards and a passport, the multilayer body of the present invention is used as a recording layer in which various types of information are printed. The multilayer body of the present invention is used as a data page in a passport.

The multilayer body is, for example, further laminated on another film, and the multilayer body and the film are melt-integrated by heat press-molding, lamination forming, or the like to form a multilayer article (hereinafter referred to as secondary formed body) for a passport or a card. By subjecting the resulting secondary formed body to, for example, punching into a desired size, a data sheet for a passport, in particular, a data sheet for an electric passport or a card is obtained. Then, the secondary formed body, preferably a section composed of the multilayer body among the secondary formed body is irradiated with laser light to apply laser marking, whereby a passport, an electric passport, or a card on which a personal name, a symbol, letters, a photograph, and the like is marked to print personal information and the like can be obtained.

As another film as described above, for example, a resin film formed of a polycarbonate resin, a polyester resin, or the like is used. Another film is a resin film for forming a core sheet or a protective layer, an inlet sheet, a hinge sheet, or the like as described later.

For example, the card includes, in addition to the multilayer body of the present invention, a core sheet, and the multilayer body of the present invention may be laminated on one surface or both surfaces of the core sheet. The card may include a protective layer, and for protecting the multilayer body, a protective layer formed of a resin film or the like may further be laminated on a surface of the multilayer body.

The core sheet is preferably a resin sheet in which a polycarbonate resin, a polyester resin, or the like is used as a resin material, and is preferably a sheet that appropriately contains a coloring agent, such as a white pigment. The thickness of the core sheet is, for example, about 400 to 700 μm.

In the case of a passport (data page of a passport), in particular, an electric passport, in addition to the multilayer body, a hinge sheet and a core sheet provided on each of the two surfaces of the hinge sheet may be included, and the multilayer body of the present invention may be laminated on a surface of the core sheet. The passport may have a so-called inlet sheet, which is a sheet on which a storage medium, such as an IC chip, storing various types of information, is mounted. The inlet sheet may be provided, for example, between a hinge sheet and a core sheet.

The hinge sheet is a sheet that holds a recording layer, a core sheet, an inlet sheet, etc., and that acts to firmly integrally bind a cover of a passport to others such as a visa sheet or the like. Thus, a sheet that has a strong heat fusibility, a moderate flexibility, a heat resistance in a heat fusion step, and the like is preferred.

As the hinge sheet, a known one can be used, and the hinge sheet may be a resin sheet constituted of a thermoplastic resin, a thermoplastic elastomer, or the like, may be constituted of a textile, a knit, a nonwoven fabric, or the like, or may be a composite material of a textile, a knit, or a nonwoven fabric and a thermoplastic resin or a thermoplastic elastomer. The core sheet in a passport is the same as above except that the thickness of 50 to 200 μm is preferred.

EXAMPLES

Examples and Comparative Examples will be shown below, but the present invention is not to be limited by the examples.

Raw materials used in Examples and Comparative Examples are as follows.

PE: "ULTZEX2021L" manufactured by Prime Polymer Co., Ltd, LLDPE.

PC-1: Iupilon H-3000" manufactured by Mitsubishi Engineering-Plastics Corporation (glass transition temperature: 158° C.), bisphenol A-type polycarbonate resin PC-2: polycarbonate resin (glass transition temperature: 108° C.), obtained by a melt polymerization method in which isosorbide and 1,4-cyclohexanedimethanol were used as dihydroxy compounds so as to give a ratio of the isosorbide-derived structural unit and 1,4-cyclohexanedimethanol-derived structural unit of 50:50 (% by mole)

Leuco colorant: "RED520" manufactured by YAMADA CHEMICAL CO., LTD., 2-methyl-6-(N-p-tolyl-N-ethylamino)fluoran, pyrolysis temperature: 330° C., crystalline melting temperature: 169° C.

Developer: "TOMILAC KN" manufactured by Mitsubishi Chemical Corporation, 4-hydroxy-4'-n-propoxy diphenylsulfone, pyrolysis temperature: 290° C., crystalline melting temperature: 156° C.

Photothermal converting agent: "YKR-3080" manufactured by Yamamoto Chemicals Inc., a heterocyclic porphyrazine vanadium compound, maximum value of absorption peak: 1005.5 nm, decomposition temperature: 270° C. or higher

Example 1

Into a labo plastomill "4C150" manufactured by Toyo Seiki Seisaku-sho, Ltd., raw materials were put at a certain ratio as shown in Tables 1 and 2 and were melt-kneaded at 200° C. and 60 rpm for 5 minutes, and the resulting resin composition was subjected to press-molding at 200° C. to thus produce a film (A-2) and a film (B-1) for the resin layer (A) and the resin layer (B). Each film had a thickness of about 70 μm. The obtained films (A-2) and (B-1) were superposed and then, were subjected to heat press at 100° C. and 20 MPa for 10 seconds to produce a multilayer body having a two-layer structure of the resin layer (A) and the resin layer (B).

Examples 2 to 6, Comparative Examples 1 and 2

A multilayer body having a two-layer structure was produced in the same manner as in Example 1 except for changing the raw materials mixed and the amounts blended to those as shown in Tables 1 and 2 and changing the films for the resin layer (A) and the resin layer (B) to those as shown in Table 3.

Example 7

A multilayer body having a three-layer structure was produced in the same manner as in Example 1 except for placing an intermediate resin layer (C-2) between the obtained films (A-2) and (B-1) and superposing the layer and films.

Example 8

Into a labo plastomill "4C150" manufactured by Toyo Seiki Seisaku-sho, Ltd., raw materials were put at a certain ratio as shown in Tables 1 and 2 and were melt-kneaded at 230° C. and 60 rpm for 5 minutes, and the resulting resin composition was subjected to press-molding at 200° C. with a heat press "IMC-18DA model" manufactured by Imoto machinery Co., LTD. to thus produce a film (A-6) and a film (B-4) for the resin layer (A) and the resin layer (B). Each film had a thickness of about 250 μm. The obtained films (A-6) and (B-4) were superposed and then, were subjected to heat press at 150° C. and 20 MPa for 10 seconds to thus produce a multilayer body having a two-layer structure of the resin layer (A) and the resin layer (B).

Example 9

Into a co-rotation twin screw extruder (φ25 mm), raw materials were put at a certain ratio as shown in Tables 1 and 2 and were melt-kneaded and extruded at 230° C. and 120 rpm to produce a film (A-7) and a film (B-5) for the resin layer (A) and the resin layer (B). Each film had a thickness of 40 μm. The obtained films (A-7) and (B-5) were superposed and then, were subjected to vacuum heat press at 140° C. and 100 kPa for 2 minutes with a vacuum heat press molder "LAMINATOR 0505S" manufactured by Nisshinbo Mechatronics Inc. to produce a multilayer body having a two-layer structure of the resin layer (A) and the resin layer (B). In the multilayer body after press-molding, color development was not observed.

Example 10

A multilayer body having a two-layer structure was produced in the same manner as in Example 9 except for changing the raw materials mixed and the amounts blended to those as shown in Tables 1 and 2 and changing the films for the resin layer (A) and the resin layer (B) to those as shown in Table 3. In the multilayer body after press-molding, color development was not observed.

Comparative Examples 3 to 6

A film for the resin layer (A) or the resin layer (B) was produced while changing the raw materials mixed and the amounts blended to those as shown in Tables 1 and 2.

[Evaluation Methods]

(Color Developing Property in Forming Resin Layer)

In Examples and Comparative Examples, the obtained films for the resin layer (A) and the resin layer (B) were visually observed for evaluation according to the following criteria.

A: Both the films develop no color.

B: Either film develops a color.

(Secondary Heat Color Developing Property)

The multilayer body obtained by press-molding was visually observed to check the color developing property after press-molding at 100° C. or 150° C. and 20 MPa for 10 seconds according to the following criteria.

A: The multilayer body after press-molding develops a color.

B: The multilayer body after press-molding develops no color.

(Laser Color Developing Property)

Using "3-Axis UV Laser Marker MD-U1000C" manufactured by KEYENCE CORPORATION, laser printing of a square of 10 mm×10 mm was performed under conditions of a wavelength of 355 nm, a power of 0.5 W, a scanning speed of 1000 minis, a frequency of kHz, a hunching pitch of 40 μm, a scanning direction crossing (0°/90°), and a heat quantity of 2.64 J/pcs. The color developing property after laser printing was checked and evaluated according to the following criteria.

A: A laser-irradiated section after laser printing develops a color.

B: A laser-irradiated section after laser printing develops no color.

TABLE 1

| Film No. | | A-1 | A-2 | A-3 | A-4 | A-5 | A-6 | A-7 | A-8 |
|---|---|---|---|---|---|---|---|---|---|
| PE | parts by mass | 100 | 100 | 100 | 100 | 100 | — | — | — |
| PC-1 | parts by mass | — | — | — | — | — | 100 | — | — |
| PC-2 | parts by mass | — | — | — | — | — | — | 100 | 100 |
| Leuco colorant | parts by mass | 0.02 | 0.2 | 1.0 | 1.0 | 6.4 | 17.6 | 1.0 | 1.0 |
| Developer | parts by mass | — | — | — | 0.02 | — | — | — | — |
| Photothermal converting agent | parts by mass | — | — | — | — | — | — | — | 0.01 |
| Thickness | μm | 70 | 70 | 70 | 70 | 70 | 250 | 40 | 40 |

TABLE 2

| Film No. | | B-1 | B-2 | B-3 | C-1 | C-2 | B-4 | B-5 | B-6 |
|---|---|---|---|---|---|---|---|---|---|
| PE | parts by mass | 100 | 100 | 100 | 100 | 100 | — | — | — |
| PC-1 | parts by mass | — | — | — | — | — | 100 | — | — |
| PC-2 | parts by mass | — | — | — | — | — | — | 100 | 100 |
| Leuco colorant | parts by mass | — | — | — | — | — | — | — | — |
| Developer | parts by mass | 0.4 | 2.0 | 13.6 | — | — | 42.9 | 1.0 | 1.0 |

TABLE 2-continued

| Film No. | | B-1 | B-2 | B-3 | C-1 | C-2 | B-4 | B-5 | B-6 |
|---|---|---|---|---|---|---|---|---|---|
| Photothermal converting agent | parts by mass | — | — | — | — | — | — | — | 0.01 |
| Thickness(μm) | μm | 70 | 70 | 70 | 70 | 40 | 250 | 40 | 40 |

TABLE 3

| | Example 1 | Example 2 | Example 3 | Example 4 | Example 5 | Example 6 | Comparative Example 1 | Comparative Example 2 | Example 7 | Example 8 |
|---|---|---|---|---|---|---|---|---|---|---|
| Resin layer (A) | A-2 | A-3 | A-5 | A-1 | A-1 | A-4 | A-5 | C-1 | A-2 | A-6 |
| Resin layer (B) | B-1 | B-2 | B-3 | B-1 | B-2 | B-2 | C-1 | B-1 | B-1 | B-4 |
| Intermediate layer | — | — | — | — | — | — | — | — | C-2 | — |
| Color developing property in forming resin layer | A: not developing | A: not developing | A: not developing | A: not developing | A: not developing | A: not developing | A: not developing | A: not developing | A: not developing | A: not developing |
| Secondary heat color developing property | A: developing | A: developing | A: developing | A: developing | A: developing | A: developing | B: not developing | B: not developing | A: developing | A: developing |

TABLE 4

| | Example 9 | Example 10 | Comparative Example 3 | Comparative Example 4 | Comparative Example 5 | Comparative Example 6 |
|---|---|---|---|---|---|---|
| Resin layer (A) | A-7 | A-8 | A-7 | A-8 | — | — |
| Resin layer (B) | B-5 | B-6 | — | — | B-5 | B-6 |
| Color developing property in forming resin layer | A: not developing | A: not developing | A: not developing | A: not developing | A: not developing | A: not developing |
| Laser color developing property | A: developing | A: developing | B: not developing | B: not developing | B: not developing | B: not developing |

In Examples 1 to 8 described above, in a multilayer body having a two-layer structure of the resin layer (A) and the resin layer (B) or a three-layer structure of the resin layer (A), the intermediate resin layer (C), and the resin layer (B), by incorporating a colorant in the resin layer (A) and a developer in the resin layer (B) in predetermined amounts, color development could be observed by press-molding. The press-molding in Examples 1 to 8 was performed under heat and high pressure, which was for simulatively checking whether a color development could be achieved by laser irradiation. In Examples, development of a desired color is expected also by laser irradiation, for example, by further incorporating a photothermal converting agent in the multilayer body. In addition, in the Examples, without containing a developer and a colorant in amounts equal to the specified amounts or more respectively into the resin layer (A) and the resin layer (B), the films for the resin layer (A) and the resin layer (B) developed no color and thus, color development through a reaction of the colorant and the developer by heat in forming each resin layer could be prevented.

In Example 8, in which the contents of the colorant and the developer were larger than those in the other Examples, the multilayer body was slightly harder than those of the other Examples and the handleability of the multilayer body was poorer a little, but it was such a level that causes no problem in actual use. In addition, although a sufficient transparency could be secured, yellowing, although at a slight degree, was observed as compared with the other Examples. However, in terms of the color tone, it was such a level that causes no problem in actual use.

In contrast, in Comparative Examples 1 and 2, two resin layers were provided but the resin layer (A) did not contain a colorant, or the resin layer (B) did not contain a developer. Thus, color development by press-molding was not observed. Accordingly, it was expected that no color was developed also by laser irradiation and thus, a multilayer body properly developing a color by laser irradiation could not be provided.

In Examples 9 and 10, in the multilayer body including the resin layer (A) and the resin layer (B), by incorporating a colorant in the resin layer (A) and a developer in the resin layer (B) in predetermined amounts, color development by laser printing could be observed. Furthermore, in Examples 9 and 10, color development was not observed in producing the films for the resin layer (A) and the resin layer (B) or in laminating the layers. Accordingly, it was demonstrated that the multilayer body of the present invention can be produced without causing color development.

On the other hand, Comparative Examples 3 to 6 provided a resin sheet having a single-layer structure of only any one of the resin layer (A) and the resin layer (B), and thus, color development by laser printing could not be observed.

The invention claimed is:

1. A multilayer body for a passport or a card comprising a resin layer (A) and a resin layer (B), wherein the resin layer (A) comprises a resin (a) and a colorant, a content of the colorant in the resin layer (A) is less than 50 parts by mass relative to 100 parts by mass of the resin (a), and a content of a developer in the resin layer (A) is less than 0.5 parts by mass relative to 100 parts by mass of the resin (a), the resin layer (B) comprises a resin (b) and a developer, a content of the developer in the resin layer (B) is less than 50 parts by mass relative to 100 parts by mass of the resin (b), and a content of a colorant in the resin layer (B) is less than 0.5 parts by mass relative to 100 parts by mass of the resin (b), the resin layer (B) is directly laminated on at least one surface of the resin layer (A) such that the resin layer (B) and at least one surface of the resin layer (A) are directly in contact to each other, either the resin (a) or the resin (b) or both comprises a polycarbonate resin containing a structural unit derived from a dihydroxy compound having in a part of the structure a moiety represented by a following formula (1), wherein a case where the moiety represented by the formula (1) is a part of $—CH_2—O—H$ is excluded, $$—(CH_2—O)— \quad (1)$$

when used as the resin layer (A), the polycarbonate resin has a glass transition temperature being lower than a crystalline melting temperature of the colorant contained in the resin layer (A) by 5° C. or more, and when used in the resin layer (B), the polycarbonate resin has a glass transition temperature being lower than a crystalline melting temperature of the developer contained in the resin layer (B) by 5° C. or more.

2. The multilayer body according to claim 1, wherein the resin layer (A) has a thickness of more than 6 μm.

3. The multilayer body according to claim 1, wherein the resin layer (B) has a thickness of more than 6 μm.

4. The multilayer body according to claim 1, wherein the content of the colorant in the resin layer (A) is 30 parts by mass or less relative to 100 parts by mass of the resin (a).

5. The multilayer body according to claim 1, wherein the content of the developer in the resin layer (B) is 30 parts by mass or less relative to 100 parts by mass of the resin (b).

6. The multilayer body according to claim 1, wherein the colorant has a pyrolysis temperature of 200° C. or higher.

7. The multilayer body according to claim 1, wherein the developer has a pyrolysis temperature of 200° C. or higher.

8. The multilayer body according to claim 1, wherein the colorant has a crystalline melting temperature of 100° C. or higher.

9. The multilayer body according to claim 1, wherein the colorant has a crystalline melting temperature of 300° C. or lower.

10. The multilayer body according to claim 1, wherein the developer has a crystalline melting temperature of 100° C. or higher.

11. The multilayer body according to claim 1, wherein the developer has a crystalline melting temperature of 300° C. or lower.

12. The multilayer body according to claim 1, wherein the multilayer body has a ratio (B1/A1) of a content (B1) to a content (A1) of 0 or more and 0.5 or less, wherein the content of the colorant relative to 100 parts by mass of the resin (a) in the resin layer (A) is the content (A1), and the content of the colorant relative to 100 parts by mass of the resin (b) in the resin layer (B) is the content (B1).

13. The multilayer body according to claim 1, wherein the multilayer body has a ratio (A2/B2) of a content (A2) to a content (B2) of 0 or more and 0.5 or less, wherein the content of the developer relative to 100 parts by mass of the resin (a) in the resin layer (A) is the content (A2) and the content of the developer relative to 100 parts by mass of the resin (b) in the resin layer (B) is the content (B2).

14. The multilayer body according to claim 1, wherein the multilayer body has a ratio (A1/B2) of a content (A1) to a content (B2) of 0.01 or more and 3 or less, wherein the content of the colorant relative to 100 parts by mass of the resin (a) in the resin layer (A) is the content (A1) and the content of the developer relative to 100 parts by mass of the resin (b) in the resin layer (B) is the content (B2).

15. The multilayer body according to claim 1, wherein the multilayer body has an area of 400 $cm^2$ or less.

16. The multilayer body according to claim 1, wherein the multilayer body has an area of 200 $cm^2$ or less.

17. The multilayer body according to claim 1, wherein the multilayer body is capable of developing a color by laser irradiation.

18. A card comprising the multilayer body according to claim 1.

19. A passport comprising the multilayer body according to claim 1.

20. A multilayer body for a passport or a card comprising a resin layer (A), a resin layer (B), and an intermediate resin layer (C) disposed between the resin layer (A) and the resin layer (B), wherein the resin layer (A) comprises a resin (a) and a colorant, a content of the colorant in the resin layer (A) is less than 50 parts by mass relative to 100 parts by mass of the resin (a), and a content of a developer in the resin layer (A) is less than 0.5 parts by mass relative to 100 parts by mass of the resin (a), the resin layer (B) comprises a resin (b) and a developer, a content of the developer in the resin layer (B) is less than 50 parts by mass relative to 100 parts by mass of the resin (b), and a content of a colorant in the resin layer (B) is less than 0.5 parts by mass relative to 100 parts by mass of the resin (b), the intermediate resin layer (C) is a thermoplastic resin layer, either the resin (a) or the resin (b) or both comprises a polycarbonate resin containing a structural unit derived from a dihydroxy compound having in a part of the structure a moiety represented by a following formula (1), wherein a case where the moiety represented by the formula (1) is a part of $—CH_2—O—H$ is excluded, wherein the dihydroxy compound has a cyclic ether structure, $$—(CH_2—O)— \quad (1)$$

when used as the resin layer (A), the polycarbonate resin has a glass transition temperature being lower than a crystalline melting temperature of the colorant contained in the resin layer (A) by 5° C. or more, and when used in the resin layer (B), the polycarbonate resin has a glass transition temperature being lower than a crystalline melting temperature of the developer contained in the resin layer (B) by 5° C. or more.

21. A method of producing the multilayer body according to claim 1, the method comprising:

melt-kneading a resin (a) and a colorant to produce a resin composition (A), melt-kneading a resin (b) and a developer to produce a resin composition (B), and laminating a resin layer (A) comprising the resin composition (A) and a resin layer (B) comprising the resin composition (B) by an extrusion method or a lamination method to produce the multilayer body.

22. A laser marking method comprising applying a laser irradiation on the multilayer body produced by the method of producing a multilayer body according to claim 21.

23. A method of producing a card or a passport including the multilayer body according to claim 1, the method comprising:

laminating the multilayer body and a film by melt-bonding, and applying laser marking by laser irradiation.

24. A method of producing a multilayer body for a passport or a card, the multilayer body comprising a resin layer (A) and a resin layer (B), the resin layer (A) comprising a resin (a) and a colorant, and the resin layer (B) comprising a resin (b) and a developer; the method comprising a step of laminating the resin layer (B) directly on at least one surface of the resin layer (A) by melt-extruding such that the resin layer (B) and at least one surface of the resin layer (A) are directly in contact to each other, wherein a content of the colorant in the resin layer (A) is less than 50 parts by mass relative to 100 parts by mass of the resin (a), and a content of a developer in the resin layer (A) is less than 0.5 parts by mass relative to 100 parts by mass of the resin (a), a content of the developer in the resin layer (B) is less than 50 parts by mass relative to 100 parts by mass of the resin (b), and a content of a colorant in the resin layer (B) is less than 0.5 parts by mass relative to 100 parts by mass of the resin (b), either the resin (a) or the resin (b) or both comprises a polycarbonate resin containing a structural unit derived from a dihydroxy compound having in a part of the structure a moiety represented by a following formula (1), wherein a case where the moiety represented by the formula (1) is a part of $-CH_2-O-H$ is excluded, $$-\!\!\left(CH_2-O\right)\!\!- \quad (1)$$

when used as the resin layer (A), the polycarbonate resin has a glass transition temperature being lower than a crystalline melting temperature of the colorant contained in the resin layer (A) by 5° C. or more, and when used in the resin layer (B), the polycarbonate resin has a glass transition temperature being lower than a crystalline melting temperature of the developer contained in the resin layer (B) by 5° C. or more.

* * * * *